(12) United States Patent
Rule et al.

(10) Patent No.: US 7,277,464 B2
(45) Date of Patent: *Oct. 2, 2007

(54) METHOD AND APPARATUS FOR CONTROLLING THE OUTPUT OF A GAS DISCHARGE LASER SYSTEM

(75) Inventors: John A. Rule, Hingham, MA (US); Paolo Zambon, San Diego, CA (US); Tom A. Watson, Carlsbad, CA (US); Omez S. Mesina, San Diego, CA (US); Weijie Zheng, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 11/035,938

(22) Filed: Jan. 13, 2005

(65) Prior Publication Data

US 2005/0185690 A1    Aug. 25, 2005

Related U.S. Application Data

(63) Continuation-in-part of application No. 10/740,659, filed on Dec. 18, 2003, now Pat. No. 7,209,507.

(51) Int. Cl.
*H01S 3/22* (2006.01)

(52) U.S. Cl. .............. 372/59; 372/55; 372/8
(58) Field of Classification Search ......... 372/55, 372/57–59
See application file for complete search history.

(56) References Cited

U.S. PATENT DOCUMENTS

| | | | |
|---|---|---|---|
| 4,223,279 A | 9/1980 | Bradford, Jr. et al. | 331/94.5 |
| 4,455,658 A | 6/1984 | Sutter et al. | 372/38 |
| 4,959,840 A | 9/1990 | Akins et al. | 372/57 |
| 5,023,884 A | 6/1991 | Akins et al. | 372/57 |
| 5,025,445 A | 6/1991 | Anderson et al. | 372/20 |
| 5,025,446 A | 6/1991 | Kuizenga | 372/21 |
| 5,142,543 A | 8/1992 | Wakabayashi et al. | 372/32 |
| 5,189,678 A | 2/1993 | Ball et al. | 372/28 |
| 5,313,481 A | 5/1994 | Cook et al. | 372/37 |
| 5,315,611 A | 5/1994 | Ball et al. | 372/56 |
| 5,359,620 A | 10/1994 | Akins | 372/58 |
| 5,448,580 A | 9/1995 | Birx et al. | 372/38 |
| 5,450,436 A | 9/1995 | Mizoguchi et al. | 372/59 |
| 5,471,965 A | 12/1995 | Kapich | 123/565 |
| 5,642,374 A | 6/1997 | Wakabayashi et al. | 372/57 |
| 5,754,579 A | 5/1998 | Mizoguchi et al. | 372/58 |
| 5,852,621 A | 12/1998 | Sandstrom | 372/25 |
| 5,863,017 A | 1/1999 | Larson et al. | 248/176.1 |
| 5,887,014 A * | 3/1999 | Das | 372/59 |
| 5,953,360 A | 9/1999 | Vitruk et al. | 372/87 |

(Continued)

FOREIGN PATENT DOCUMENTS

| | | |
|---|---|---|
| JP | 2601410 | 1/1997 |
| JP | 09-097951 | 4/1997 |
| JP | 2701184 | 10/1997 |

(Continued)

*Primary Examiner*—Minsun Oh Harvey
*Assistant Examiner*—Phillip Nguyen
(74) *Attorney, Agent, or Firm*—William Cray

(57) ABSTRACT

The present invention relates to a fluorine gas discharge laser system and control of replenishment of fluorine gas as the gas discharge laser operates and consumes fluorine.

20 Claims, 11 Drawing Sheets

U.S. PATENT DOCUMENTS

| | | | | |
|---|---|---|---|---|
| 5,978,394 | A | 11/1999 | Newman et al. | 372/32 |
| 5,978,406 | A | 11/1999 | Rokni et al. | 372/58 |
| 5,991,324 | A | 11/1999 | Knowles et al. | 372/57 |
| 6,005,879 | A | 12/1999 | Sandstrom et al. | 372/25 |
| 6,016,325 | A | 1/2000 | Ness et al. | 372/38 |
| 6,018,537 | A | 1/2000 | Hofmann et al. | 372/25 |
| 6,028,880 | A | 2/2000 | Carlesi et al. | 372/58 |
| 6,067,311 | A | 5/2000 | Morton et al. | 372/57 |
| 6,094,448 | A | 7/2000 | Fomenkov et al. | 372/102 |
| 6,104,735 | A | 8/2000 | Webb | 372/37 |
| 6,128,323 | A | 10/2000 | Myers et al. | 372/38 |
| 6,130,904 | A | 10/2000 | Ishihara et al. | 372/59 |
| 6,151,349 | A | 11/2000 | Gong et al. | 372/58 |
| 6,160,832 | A * | 12/2000 | Kleinschmidt et al. | 372/57 |
| 6,164,116 | A | 12/2000 | Rice et al. | 73/1.72 |
| 6,192,064 | B1 | 2/2001 | Algots et al. | 372/99 |
| 6,208,674 | B1 | 3/2001 | Webb et al. | 372/57 |
| 6,208,675 | B1 | 3/2001 | Webb | 372/58 |
| 6,212,211 | B1 | 4/2001 | Azzola et al. | 372/33 |
| 6,212,214 | B1 | 4/2001 | Volger et al. | 372/59 |
| 6,219,368 | B1 | 4/2001 | Govorkov | 372/59 |
| 6,240,117 | B1 | 5/2001 | Gong et al. | 372/58 |
| 6,243,406 | B1 * | 6/2001 | Heist et al. | 372/59 |
| 6,317,447 | B1 | 11/2001 | Partlo et al. | 372/57 |
| 6,320,892 | B1 * | 11/2001 | Padmabandu et al. | 372/59 |
| 6,330,261 | B1 | 12/2001 | Ishihara et al. | 372/38.1 |
| 6,330,267 | B1 | 12/2001 | Volger et al. | 372/59 |
| 6,389,052 | B2 * | 5/2002 | Albrecht et al. | 372/58 |
| 6,414,979 | B2 | 7/2002 | Ujazdowski et al. | 372/87 |
| 6,477,193 | B2 | 11/2002 | Oliver et al. | 372/58 |
| 6,490,307 | B1 | 12/2002 | De Mos et al. | 372/59 |
| 6,490,308 | B2 | 12/2002 | Albrecht et al. | 372/59 |
| 6,493,370 | B2 * | 12/2002 | Albrecht et al. | 372/58 |
| 6,504,861 | B2 * | 1/2003 | Albrecht et al. | 372/59 |
| 6,526,085 | B2 * | 2/2003 | Vogler et al. | 372/58 |
| 6,529,533 | B1 | 3/2003 | Voss | 372/29.01 |
| 6,556,600 | B2 | 4/2003 | Sandstrom et al. | 372/25 |
| 6,563,853 | B2 | 5/2003 | Heist et al. | 372/57 |
| 6,690,704 | B2 | 2/2004 | Fallon et al. | 372/58 |
| 6,965,624 | B2 * | 11/2005 | Albrecht et al. | 372/57 |
| 2002/0031157 | A1 * | 3/2002 | Heist et al. | 372/55 |
| 2005/0135451 | A1 | 6/2005 | Rule et al. | 372/55 |

FOREIGN PATENT DOCUMENTS

| | | |
|---|---|---|
| JP | 10-074993 | 3/1998 |
| JP | 2000-022255 | 1/2000 |
| JP | 2001-332793 | 11/2001 |
| JP | 2002-208746 | 7/2002 |
| JP | 3297108 | 7/2002 |
| JP | 2002-294856 | 10/2002 |

* cited by examiner

METHOD AND APPARATUS FOR CONTROLLING THE OUTPUT OF A GAS DISCHARGE LASER SYSTEM

RELATED APPLICATIONS

This application is a continuation in part of U.S. patent application Ser. No. 10/740,659, filed on Dec. 18, 2003, entitled METHOD AND APPARATUS FOR CONTROLLING THE OUTPUT OF A GAS DISCHARGE MOPA LASER SYSTEM, the disclosure of which is hereby incorporated by reference.

FIELD OF THE INVENTION

The present invention relates to a fluorine gas discharge laser system and control of replenishment of fluorine gas as the gas discharge laser operates and consumes fluorine.

BACKGROUND OF THE INVENTION

Halogen based, and particularly fluorine based gas discharge lasers, e.g., KrF and ArF excimer lasers and molecular fluorine lasers are well known. They have been implemented as an oscillator, in which, e.g., a gas discharge laser, which is in a resonator cavity configuration, and with a very accurate line narrowing module or package ("LNM" or "LNP") produces an output laser light pulse beam of pulses with a precisely defined center wavelength and a bandwidth on the order of femtometers. The output parameters of laser output light pulse beam pulses from the oscillator gas discharge laser depend on a variety of operating parameters, including the initial makeup of the gases, usually a halogen, e.g., fluorine, a noble gas, e.g., argon or krypton, and a buffer, e.g., neon. The makeup of these gases in the oscillator also varies over time, particularly as the halogen is consumed in the creating of the laser light output pulse beam of pulses by the gas discharges occurring within the chamber containing the gases in the oscillator. It has been found that previously used techniques for accounting for such things as the changes in the gas composition over time in oscillating gas discharge lasers are not as effective as is desirable.

Current $F_2$ monitor and control unsatisfactory performance can be thought to stem primarily from at least the voltage accounting being adversely affected by the nonlinear voltage response to other operating parameters, e.g., duty cycle changes as a function of current $F_2$ concentration, that is, e.g., the voltage change due to a 75% to 6% DC change is not the same when the fill is rich versus lean. In the past applicants had used a so-called NewOpPoint state. The original purpose of the NewOpPoint state was to track voltage changes associated with duty cycle and energy setpoint changes. Then, only the reference voltage—plus a carefully accounted-for reference voltage offset—was originally thought to properly maintain the laser gas state. This was found in practice to provide less than acceptable performance.

The design according to preferred embodiments of the present invention set for below is intended to address the above noted flaws, with the goal of improved gas mix regulation.

A number of prior art patents and published applications address various ways of monitoring and controlling gas mix in halogen gas discharge lasers, e.g., excimer lasers and molecular fluorine lasers. U.S. Pat. No. 5,978,406, issued to Rokni, et al. on Nov. 2, 1999, entitled FLUORINE CONTROL SYSTEM FOR EXCIMER LASERS, based upon an application Ser. No. 09/016525, filed on Jan. 30, 1998, and assigned to Cymer, related to fluorine gas replenishment at a continuous or substantially continuous rates based upon feedback from a real time or substantially real time fluorine monitor to maintain fluorine at substantially a selected value. U.S. Pat. No. 6,028,880, issued to Carlesi, et al. on Feb. 22, 2000, entitled AUTOMATIC FLUORINE CONTROL SYSTEM, based upon an application Ser. No. 09/109,596 filed on Jul. 2, 1998, which was a continuation in part of Ser. No. 09/016,525, filed on Jan. 30, 1998, now U.S. Pat. No. 5,978,406 and assigned to Cymer, relates to fluorine gas replenishment at continuous or substantially continuous rates based upon feedback from a real time or substantially real time fluorine monitor, from a fluorine source at high pressure through a bottle having a volume of at least 0.3 liters, to maintain fluorine at substantially a selected value. U.S. Pat. No. 6,240,117, issued to Gong, et al. on May 29, 2001, entitled FLUORINE CONTROL SYSTEM WITH FLUORINE MONITOR, based on an application Ser. No. 09/191,446, filed on Nov. 12, 1998, which was a continuation-in-part of Ser. No. 09/016,525, filed Jan. 30, 1998 now U.S. Pat. No. 5,978,406 issued date Nov. 2, 1999 entitled FLUORINE CONTROL SYSTEM FOR EXCIMER LASER and Ser. No. 09/109,596 filed Jul. 2, 1998 now U.S. Pat. No. 6,028,880 issue date Feb. 22, 2000 entitled AUTOMATIC FLUORINE CONTROL SYSTEM relates to an $F_2$ replenishment system based upon the amount of fluorine found in a sample taken from "downstream of said blower" (i.e., in the chamber) measured with an absorption meter, first passing through a metal fluoride trap. U.S. Pat. No. 6,151,349, issued to Gong, et al. on Nov. 21, 2000, entitled AUTOMATIC FLUORINE CONTROL SYSTEM, and assigned to Cymer, based on an application Ser. No. 09/368,208, filed on Aug. 4, 1999, which was a CIP of an application Ser. No. 09/034,870 filed Mar. 4, 1998, now U.S. Pat. No. 6,005,879 entitled PULSE ENERGY CONTROL FOR EXCIMER LASERS relates to microbursts of fluorine injection comprising controlled periodic fluorine injections at intervals as low as about 3 to 5 minutes, also said to be an "almost continuous basis." The feedback for control is $\Delta E/\Delta V$, the change in laser output with change in charging voltage. U.S. Published patent application No. 20020186739, filed in the name of Sandstrom et al., and published on Dec. 12, 2002, entitled INJECTION SEEDED F2 LASER WITH WAVELENGTH CONTROL, and assigned to Cymer relates to adjusting laser gas pressure, buffer gas mix, and $F_2$ partial pressure to control the "centerline wavelength" of the output beam in a two chamber laser. Cymer Docket No. 2002-0070-01, inventors Ishihara, et al., filed on Nov. 27, 2002, Ser. No. 60/429,493, entitled AUTOMATIC GAS CONTROL SYSTEM FOR A TWO CHAMBER LASER, and assigned to Cymer, relates to $F_2$ replenishment based upon the history of consumption rates over the laser life. Cymer Docket No. 2003-0001-01, inventors Rule, et al., filed on Jan. 31, 2003, Ser. No. 10/356,168, entitled AUTOMATIC GAS CONTROL SYSTEM FOR A GAS DISCHARGE LASER, and assigned to Cymer, relates to $F_2$ replenishment based upon the history of consumption rates over the laser life. U.S. Pat. No. 6,212,214, issued to Vogler, et al. on Apr. 3, 2001, entitled PERFORMANCE CONTROL SYSTEM AND METHOD FOR GAS DISCHARGE LASERS, and assigned to Lambda Physik, relates to gas replenishment based upon the comparison of a master data set of the relationship between an output beam parameter known to vary with gas mixture status versus an input parameter and an actual data set taken during operation. U.S. Pat. No. 6,243,406, issued to Heist, et al. on Jun.

5, 2001, entitled GAS PERFORMANCE CONTROL SYSTEM FOR GAS DISCHARGE LASERS and assigned to Lamda Physik, relates to gas replenishment based upon amplified spontaneous emission (ASE) of the laser. U.S. Pat. No. 6,330,267, issued to Vogler, et al. on Dec. 11, 2001, entitled PERFORMANCE CONTROL SYSTEM AND METHOD FOR GAS DISCHARGE LASERS, and assigned to Lambda Physik, relates to halogen gas replenishment based upon the slope of an output parameter of the laser compared to an expected slope of the parameter giving an estimate of the deviation, of the halogen from the optimum, e.g., the laser output versus input energy. U.S. Pat. No. 6,389,052, issued to Albrecht, et al. on May 14, 2002, entitled LASER GAS REPLENISHMENT METHOD, and assigned to Lambda Physik, relates to replenishment of gas at selected intervals with amount or the interval based on charging voltage variation to achieve output pulse power. U.S. Pat. No. 6,490,307, issued to de Mos, et al. on Dec. 3, 2002, entitled METHOD AND PROCEDURE TO AUTOMATICALLY STABILIZE EXCIMER LASER OUTPUT PARAMETERS, and assigned to Lambda Physik, relates to fluorine replenishment by inserting between 0.0001 mbar and 0.2 mbar of fluorine into the chamber at selected intervals or inserting constituent gas to increase total pressure in the chamber by a selected amount, or to increase the partial pressure of fluorine by between 0.0001 and 0.2 mbar at periodic intervals to return the fluorine gas substantially to said predetermined partial pressure; or based upon maintaining "relatively constant" laser output; or injecting fluorine at less than 5% of the amount in the chamber repeatedly to maintain relatively constant laser output; or less than 7% of the amount in the chamber at selected intervals; or less than 3% at selected intervals; or less than 0.1 mbar at selected intervals; or less than 0.05% mbar at selected intervals; or 0.02% mbar at selected intervals; or less than 10% halogen and buffer mix at selected intervals; or less than 5 mbar of halogen and buffer mix at selected intervals; or less than 2 mbar of halogen and buffer mix at selected intervals; or less than 1 mbar of halogen and buffer mix at selected intervals; and various other halogen buffer mixes of different percentages at different mbar maximums at selected intervals. U.S. Pat. No. 6,490,308, issued to Albrecht, et al. on Dec. 3, 2002, entitled LASER GAS REPLENISHMENT METHOD and assigned to Lambda Physik, relates to replenishment based on the value of the charging voltage. U.S. Pat. No. 6,493,370, issued to Albrecht, et al. on Dec. 10, 2002, entitled LASER GAS REPLENISHMENT METHOD and assigned to Lambda Physik, relates to a laser having a gas replenishment control system using a processor employing an algorithm for periodically determining gas actions for the gas supply unit to smoothly perform the gas actions which stabilize a composition of the laser gas mixture within the discharge chamber and to stabilize significant parameters of the laser beam, and in which the gas supply unit and said processor are configured to permit a quantity in a range substantially between 0.0001 mbar and 0.2 mbar of said halogen-containing constituent gas to inject into said laser tube at selected intervals, such that a degradation of the halogen-containing constituent gas is automatically compensated without substantially disturbing laser beam parameters, and also, e.g., with the gas is a halogen and the processor also controls discharge voltage based at least in part on energy information received from an energy detector; and also, e.g., the control is based on discharge voltage variation necessary for a predetermined output energy. U.S. Pat. No. 6,504,861, issued to Albrecht, et al. on Jan. 7, 2003, entitled LASER GAS REPLENISHMENT METHOD, assigned to Lambda Physik, relates to replenishment periodically between a certain range of mbar of a gas, based upon a known amount injected in a prior replenishment which amount injected in the prior replenishment was based on a known amount of the gas in the chamber prior to the last injection; and also varying the intervals based on the same criteria. U.S. Pat. No. 6,529,533, issued to Voss on Mar. 4, 2003, entitled BEAM PARAMETER MONITORING UNIT FOR A MOLECULAR FLUORINE (F2) LASER, assigned to Lambda Physik, relates to a molecular fluorine laser with fluorine replenishment based upon detected value of at least one of energy, energy stability, bandwidth, wavelength, beam profile, pulse shape, pulse duration, output power, pulse length and pulse to pulse stability relating to the UV beam, the red beam having been separated from the UV beam. U.S. Pat. No. 6,563,853, issued to Heist, et al. on May 13, 2003, entitled GAS PERFORMANCE CONTROL SYSTEM FOR GAS DISCHARGE LASERS, and assigned to Lambda Physik, relates to gas replenishment based upon a sample of the amplified spontaneous emission (ASE) output of the laser. U.S. Published patent application No. 20010012309 filed in the name of Albrecht, et al. and published on Aug. 9, 2001, entitled LASER GAS REPLENISHMENT METHOD, and assigned to Lambda Physik, relates to gas replenishment with the amount at selected intervals chosen based on the charging voltage; or also based on the amount injected in a previous injection. U.S. Published patent application No. 20020101901, filed in the name of Albrecht, et al. and published on Aug. 1, 2002, entitled LASER GAS REPLENISHMENT METHOD, and assigned to Lambda Physik, relates to a laser gas replenishment at periodic intervals from within a pre-selected range with the amount from within the range or the interval selected based upon a calculated amount of replenishment in the last replenishment. U.S. Published patent application No. 20020101902, filed in the name of Albrecht, et al. and published on Aug. 1, 2002, entitled LASER GAS REPLENISHMENT METHOD and assigned to Lambda Physik, relates to laser gas replenishment utilizing a processor based upon charging voltage. U.S. Published patent application No. 20020110174, filed in the name of Albrecht, et al., and published on Aug. 15, 2002, entitled LASER GAS REPLENISHMENT METHOD, and assigned to Lambda Physik, relates to halogen gas replenishment of less than 0.2 mbar, or halogen constituent gas at less than 7% of current chamber content, at regularly selected intervals, or also with a replenishment interval based on charging voltage. U.S. Pat. No. 5,142,543, issued to Wakabayashi, et al. on Aug. 25, 1992, entitled METHOD AND SYSTEM FOR CONTROLLING NARROW-BAND OSCILLATION EXCIMER LASER, assigned to Komatsu, relates to gas replenishment based upon the charging voltage. U.S. Pat. No. 5,450,436 issued to Mizoguchi, et al. on Sep. 12, 1995, entitled LASER GAS REPLENISHING APPARATUS AND METHOD IN EXCIMER LASER SYSTEM, and assigned to Komatsu, relates to halogen gas replenishment based upon beam width and with periodic injection, i.e., with a predetermined amount varied up or down based on beam width; or alternatively injecting a halogen constituent gas at predetermined intervals to a level that maintains total pressure and stopping the exhaust while injecting; or alternatively injecting a predetermined amount after a predetermined number of pulses; or alternatively based on accumulated pulses and pulse rate; or alternatively replenishing the halogen on one pulse count and the rare gas on another and exhausting to maintain pressure; or alternatively replenishing the halogen based on pulse count and the rare gas based on charging voltage. U.S. Pat. No. 5,642,374, issued to Wakabayashi, et al. on Jun. 24, 1997, entitled EXCIMER LASER DEVICE, and assigned to Komatsu, relates to gas replenishment based only upon laser output beam bandwidth. U.S. Pat. No. 5,754,579, issued to Mizoguchi, et al. on May 19, 1998, entitled LASER GAS CONTROLLER AND CHARGING/DISCHARGING DEVICE FOR DISCHARGE-EXCITED LASER, and assigned to Komatsu, relates to gas replenishment/exhaust based upon an output of the laser or alternatively based upon the charging voltage; including also bandwidth. U.S. Pat. No. 6,130,904, issued to Ishihara, et al. on Oct. 10, 2000, entitled GAS SUPPLEMENTATION METHOD OF EXCIMER LASER APPARATUS, and assigned to Komatsu, relates to halogen gas replenishment based upon partial pressure; or alternatively band width; or alternatively supplementation of a mix of rare gas and buffer gas based upon a calculated oscillation stop time; or alternatively based upon a number of other possible parameters, including based upon laser output; or alternatively based upon a "power lock voltage"; or alternatively based upon the charging voltage; or alternatively based upon a pulse count.

Japanese Patent No. 2601410, the Published Application of which 08008481 was published on Jan. 12, 1996 (application 06134468 filed on Jun. 16, 1994), assigned to Komatsu (corresponding to U.S. Pat. No. 5,754,579, which relates to claims priority from this application and another), refers to gas replenishment based on charging voltage or beam width and charging voltage. Japanese Patent No. 2701184, the Published Application of which (05192555 JP) was published on Apr. 23, 1993 (application 03290618 filed on Oct. 9, 1991), assigned to Komatsu, refers to controlling the mixture of the constituent gas mixture, based upon pulse count. Japanese Patent No. 3297108, issued on Jul. 2, 2002, assigned to Komatsu (U.S. Pat. No. 5,450,436 claims priority from this application and others), refers to gas replenishment after selected pulse count and replenishment to maintain chamber gas pressure. Refers to injection of rare gas based upon exhaust volume ("swept volume"). Japanese Published Patent Application No. 10074993 JP, published on Mar. 1, 1998, entitled GAS LASER AND LASER GAS INJECTION METHOD (Application 08246821, filed on Aug. 30, 1996) refers to gas replenishment with injections based upon chamber pressure. Japanese Patent Application No. 2001332793, published on Nov. 30, 2001 (Application JP 2000150874, filed on May 23, 2000), assigned to Komatsu, relates to feedback control, possibly including gas replenishment, based on beam properties. Japanese Published Patent Application No. 2002208746, published on Jul. 26, 2002 (Application JP 20011214 filed on Jan. 9, 2001), assigned to Komatsu, refers to replenishment based on a ratio of gases in the mixture in the chamber. Japanese Published Patent Application 10074993 JP, published on Mar. 1, 1998, based on Japanese application 08246821, filed on Aug. 30, 1996, by Wakabayashi, et al., entitled GAS LASER AND LASER GAS INJECTION METHOD, assigned to Komatsu (GigaPhoton), refers to a filtered replenishment based on chamber pressure. Japanese Published Patent Application No. 20020294856, published on Oct. 20, 2001 (Application JP 99272496, filed on Sep. 27, 1999), relates to replenishment of Xenon based upon Xe content apparently in the chamber. Japanese Published Patent Application No. 09097951 JP, published on Apr. 1, 1997, based on a Japanese Patent Application No. 07289105, filed on Sep. 29, 1995 by Senrin, et al., entitled EXCIMER LASER APPARATUS, and assigned to Nissin Electric, refers to replenishment based upon charging voltage. Japanese Published Patent application No. 2000022255, published on Jan. 21, 2000, with inventors Omi, et al., entitled METHOD FOR STABILIZING AND CONTROLLING FLUORINE GAS CONCENTRATION AND CONTROL MECHANISM THEREOF, based on a Japanese Patent Application No. JP19980191178, filed on Jul. 7, 1998 and assigned to Horiba, refers to measuring in real time the content of fluorine in the "mixed gas" by measuring absorption of UV light in the "mixed gas" and creating a feedback control signal to correct any excess or deficiency against a set value. The disclosures of all of the above are hereby incorporated by reference.

SUMMARY OF THE INVENTION

A method and apparatus for controlling the output of a gas discharge laser are disclosed, which may comprise establishing a multidimensional variable state space comprising a coordinate system having at least two coordinates, each coordinate comprising a selected variable representing an operating or output parameter of the gas discharge laser; tracking a multidimensional operating point in the multidimensional variable state space according to the variation of the selected variables in the gas discharge laser to determine the position of the multidimensional operating point in the multidimensional state space; determining from the position of the multidimensional operating point in the multidimensional operating space a region from a plurality of defined regions in the multidimensional operating space in which the multidimensional operating point is located and identifying the region; based upon the identity of the identified region, and parameters of that region relative to the condition of an actuator in the gas discharge laser, determining a necessary modification to the actuator for the gas discharge laser to attempt to move the multidimensional operating point from the parameters indicated by the position of the multidimensional operating point being in the particular region to a preselected location in the coordinate system. The multidimensional state space may comprise a two-dimensional state space. The two dimensional state space may comprise axis as the operating voltage of the gas discharge laser and the other axis as the bandwidth of the gas discharge laser output laser light pulse beam. The regions in the multidimensional state space may comprise an inner target, a first outer region having an inner boundary adjacent to the inner target and an outer boundary and a second outer region adjacent to the outer boundary of the first outer region. The inner target may comprise the origin of the coordinate system. A parameter used in defining the origin of the coordinate system may comprise duty cycle. The actuator may comprise the composition of the gas mixture inside of the gas discharge laser. The method may comprise establishing a multidimensional variable state space comprising a coordinate system having at least two coordinates, each coordinate comprising a selected variable representing an operating or output parameter of the gas discharge laser; changing the gas mixture in the gas discharge laser by injection of at least one constituent gas in the gas mixture at least part of which injection is based upon a calculated estimate of consumption of the at least one constituent gas in the gas mixture in the gas discharge laser from a prior change in the gas mixture; allowing the gas discharge laser to operate for a selected period of time with the changed gas mixture; determining the position of an operating point in the multidimensional variable state space and based upon the location of the operating point in the multidimensional state space determining a respective boost factor to modify the calculated estimate of consumption for the current change of the gas mixture. The multidimensional state space may comprise a two dimensional state space having two coordinates: the first coordinate is measure of a spectral characteristic of the gas discharge laser output light pulse beam; and the second coordinate is another operating or output parameter of the gas discharge laser. The boost factor may comprise a ±1, ±2 or 0. The position of the operating point in the multidimensional state space may be indicative of a needed correction to the spectral characteristic of the output laser light pulse beam; and the method may comprise changing the spectral characteristic of the laser output light pulse beam using a gas injection. The apparatus may comprise means for establishing a multidimensional variable state space comprising a coordinate system having at least two coordinates, each coordinate comprising a selected variable representing an operating parameter of the gas discharge laser; means for tracking a multidimensional operating point in the multidimensional variable state space according to the variation of the selected variables in the gas discharge laser to determine the position of the multidimensional operating point in the multidimensional state space; means for determining from the position of the multidimensional operating point in the multidimensional operating space a region from a plurality of defined regions in the multidimensional operating space in which the multidimensional operating point is located and identifying the region; inject determining means, based upon the identity of the identified region, and parameters of that region relative to the condition of an actuator in the gas discharge laser, for determining a necessary modification to the actuator for the gas discharge laser to attempt to move the multidimensional operating point from the parameters indicated by the position of the multidimensional operating point being in the particular region to a preselected location in the coordinate system or may comprise means for establishing a multidimensional variable state space comprising a coordinate system having at least two coordinates, each coordinate comprising a selected variable representing an operating parameter of the gas discharge laser; means for changing the gas mixture in the gas discharge laser by injection of at least one constituent gas in the gas mixture at least part of which injection is based upon a calculated estimate of consumption of the at least one constituent gas in the gas mixture in the gas discharge laser from a prior change in the gas mixture; determining means for determining, after allowing the gas discharge laser to operate for a selected period of time with the changed gas mixture, the position of an operating point in the multidimensional variable state space and based upon the location of the operating point in the multidimensional state space determining a respective boost factor to modify the calculated estimate of consumption for the current change of the gas mixture. The method may comprise establishing a two dimensional variable state space comprising a coordinate system having two coordinates, each coordinate comprising a selected variable representing an operating parameter of the gas discharge laser; tracking a two dimensional operating point in the two dimensional variable state space according to the variation of the selected variables in the gas discharge laser to determine the position the two dimensional operating point along an $F_2$ consumption axis in the two dimensional state space; determining from the position of the two dimensional operating point on the $F_2$ consumption axis a region of gas consumption occupied by the operating point; based upon the region on the $F_2$ consumption axis determining a necessary modification to the actuator for the gas discharge laser to attempt to move the multidimensional operating point based on an estimated consumption rate to a preselected location on the $F_2$ consumption axis. The two dimensional state space may comprise one coordinate axis as the operating voltage of the gas discharge laser and the other coordinate axis as another output or operating parameter of the gas discharge laser. The other output or operating parameter of the gas discharge laser may comprise the bandwidth of an output laser light pulse beam pulse. The regions on the $F_2$ consumption axis may comprise an inner target, an inner region bounded on the inner target, and an outer boundary of the inner region, and an outer region adjacent to the outer boundary of the inner region. An inner and an outer region may be defined on each side of the coordinate system origin. The method may comprise establishing a two dimensional variable state space comprising a coordinate system having two coordinates, each coordinate comprising a selected variable representing an operating or output parameter of the gas discharge laser; changing the gas mixture in the gas discharge laser by injection of at least one constituent gas in the gas mixture at least part of which injection is based upon a calculated estimate of consumption of the at least one constituent gas in the gas mixture in the gas discharge laser from a prior change in the gas mixture; allowing the gas discharge laser to operate for a selected period of time with the changed gas mixture; determining the position of an operating point in the multidimensional variable state space and based upon the location of the operating point in the multidimensional state space determining a respective boost factor to modify the calculated estimate of consumption for the current change of the gas mixture. The multidimensional state space nay comprise a two dimensional state space having two coordinates: the first coordinate may comprise a measure of a spectral characteristic of the gas discharge laser output light pulse beam; and the second coordinate is another operating or output parameter of the gas discharge laser. The multidimensional state space coordinates define regions of possible change of the gas mixture in the gas discharge laser. The apparatus may comprise means for establishing a multidimensional variable state space comprising a coordinate system having at least two coordinates, each coordinate comprising a selected variable representing an operating parameter of the gas discharge laser; means for tracking a multidimensional operating point in the multidimensional variable state space according to the variation of the selected variables in the gas discharge laser to determine the position of the multidimensional operating point in the multidimensional state space; means for determining from the position of the multidimensional operating point in the multidimensional operating space a region from a plurality of defined regions in the multidimensional operating space in which the multidimensional operating point is located and identifying the region; inject determining means, based upon the identity of the identified region, and parameters of that region relative to the condition of an actuator in the gas discharge laser, for determining a necessary modification to the actuator for the gas discharge laser to attempt to move the multidimensional operating point from the parameters indicated by the position of the multidimensional operating point being in the particular region to a preselected location in the coordinate system or the apparatus may comprise means for establishing a multidimensional variable state space comprising a coordinate system having at least two coordinates, each coordinate comprising a selected variable representing an operating parameter of the gas discharge laser; means for changing the gas mixture in the gas discharge laser by injection of at least one constituent gas in the gas mixture at least part of which injection is based upon a calculated estimate of consumption of the at least one constituent gas in the gas mixture in the gas discharge laser from a prior change in the gas mixture; determining means for determining, after allowing the gas discharge laser to operate for a selected period of time with the changed gas mixture, the position of an operating point in the multidimensional variable state space and based upon the location of the operating point in the multidimensional state space determining a respective boost factor to modify the calculated estimate of consumption for the current change of the gas mixture. The method may comprise establishing a multidimensional variable state space comprising a coordinate system having at least two coordinates, each coordinate comprising a selected variable representing an operating or output parameter of the gas discharge laser; tracking a multidimensional operating point in the multidimensional variable state space according to the variation of the selected variables in the gas discharge laser to determine the position of the multidimensional operating point in the multidimensional state space; determining from the position of the multidimensional operating point in the multidimensional operating space a region from a plurality of defined regions in the multidimensional operating space in which the multidimensional operating point is located and identifying the region; based upon the identity of the identified region, and parameters of that region relative to the condition of an actuator in the gas discharge laser, determining a necessary modification to the actuator for the gas discharge laser to attempt to move the multidimensional operating point from the parameters indicated by the position of the multidimensional operating point being in the particular region to a preselected location in the coordinate system; and periodically updating the coordinate system by modifying a reference value for at least one of the selected variables to thereby reposition an intersection point of the two coordinates defining a new origin of the coordinate system. The periodic updating in the periodic updating step may comprise updating an active consumption rate estimate of fluorine consumption for an accumulated number of pulses or an accumulated operating time since a prior injection. the periodic updating in the periodic updating step may be based in part upon the currently duty cycle of operation of the gas discharge laser. The method may comprise establishing a multidimensional variable state space comprising a coordinate system having at least two coordinates, each coordinate comprising a selected variable representing an operating or output parameter of the gas discharge laser; changing the gas mixture in the gas discharge laser by injection of at least one constituent gas in the gas mixture at least part of which injection is based upon a calculated estimate of consumption of the at least one constituent gas in the gas mixture in the gas discharge laser from a prior change in the gas mixture; allowing the gas discharge laser to operate for a selected period of time with the changed gas mixture; determining the position of an operating point in the multidimensional variable state space and based upon the location of the operating point in the multidimensional state space determining a respective boost factor to modify the calculated estimate of consumption for the current change of the gas mixture; and periodically updating the coordinate system by modifying a reference value for at least one of the selected variables to thereby reposition an intersection point of the two coordinates defining a new origin of the coordinate system. The inner target may comprise a region surrounding the origin of the coordinate system.

BRIEF DESCRIPTION OF THE DRAWINGS

The application file contains at least one drawing executed in color. Copies of this patent or patent application publication with color drawing(s) will be provided by the Office upon request and payment of the necessary fee.

DETAILED DESCRIPTION OF PREFERRED EMBODIMENTS

Figure 1:
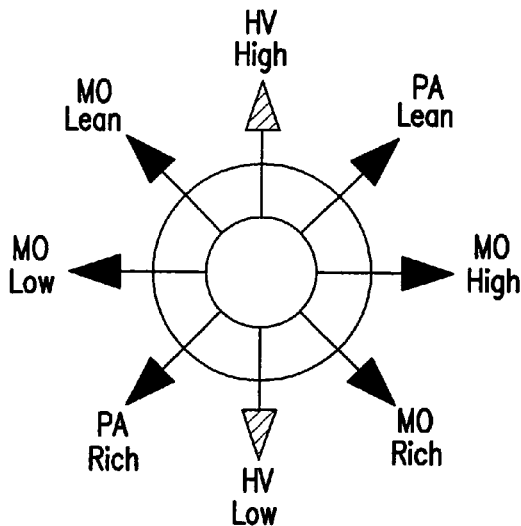
FIG. 1 shows a multidimensional operating state space according to an embodiment of the present invention.

The present invention takes into account that there are a number of possible operating states the laser system could be in, given two chambers (MO, PA) and defining several gas states, e.g., three relative gas states (Lean, Good, Rich). With "good" meaning within some pre-selected target range (which may vary over the life of the laser, e.g., as changes in the electrodes, or other effects on the discharge, cause, e.g., the charging voltage on the peaking capacitors to rise in order to maintain the desired output laser light pulse beam power requirements, which are generally dictated by the end users of the light and must be met), "lean" meaning out of range with the partial pressure low, and "rich" meaning out of range with the partial pressure high. Creating a table of the nine possible combinations ([MO Good, PA Good], [MO Good, PA Lean], [MO Good, PA Rich], etc., and combining this with possible indicators of operating performance, e.g., peaking capacitor charging voltage ("HV"), MO output energy ("Emo"), MOPA system gain ("MOPAg"), meaning the ratio of the PA output energy PAe to the Emo, the MO efficiency ("E/V$^2$")mo and Pa efficiency ("E/V$^2$")pa it is possible to list in table form what the various indicators should look like under the nine combinations. From this applicants have determined that, while other combinations may also be possible, the MO energy and HV are believed to be the most reliable pair. It is possible according to aspects of an embodiment of the present invention to arrange the variables for purposes of consideration into, e.g., a geometric interpretation of the results, e.g., the utilization of a multidimensional state space. Such a multi-dimensional state space may be, e.g., a two-dimensional state space for the expression of the gas control problem, e.g., with Cartesian coordinates x=Emo and y=HV. Applicants then overlaid these coordinates with "gas axes" of MO [F$_2$] and PA [F$_2$], e.g., rotated by 45° as is shown in FIG. 1.

Figure 2:
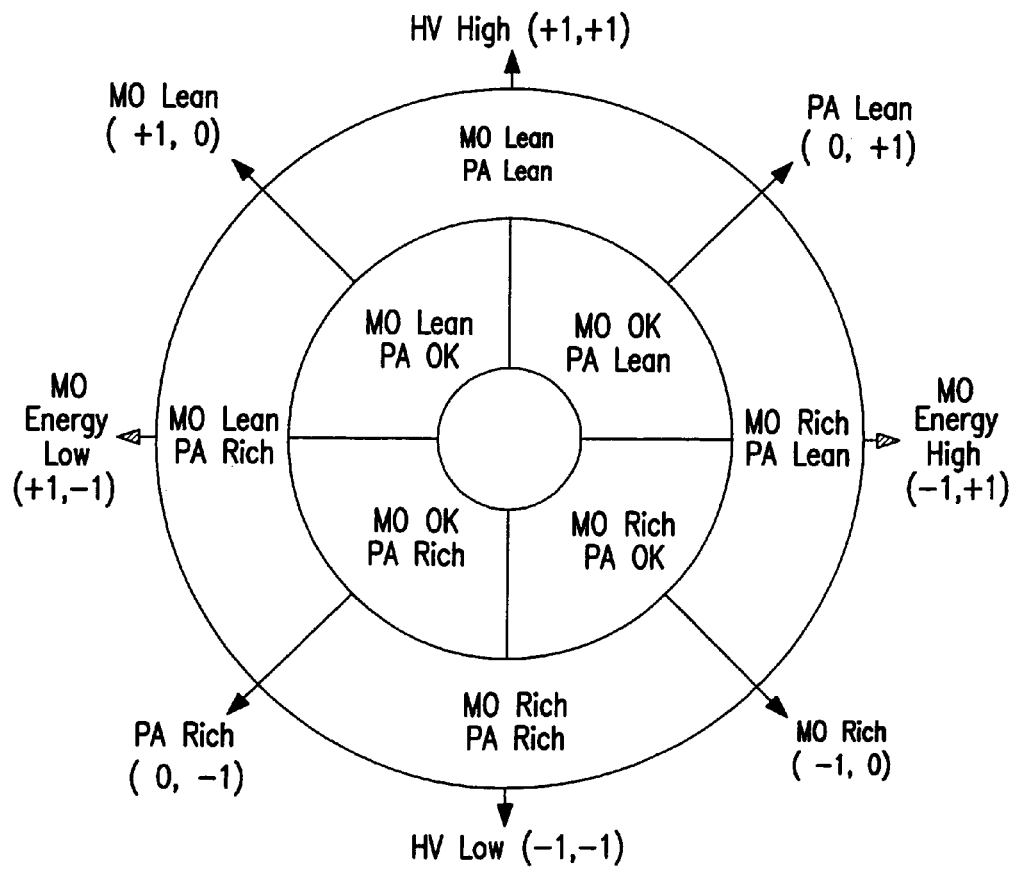
FIG. 2 shows a plurality of operation regions imposed upon the state space diagram of FIG. 1 according to an embodiment of the present invention.

According to aspects of an embodiment of the present invention applicants propose to provide a simple state-space representation in a multidimensional stat-space, e.g., the two dimensional state-space, of the two-chambered gas states. The system and process according to an embodiment of the present invention can then provide for a mapping from measurable quantities, e.g., Emo, HV, to a gas state (MO Lean/Good/Rich, PA Lean/Good/Rich) within one of the, e.g., nine possible combinations, including a center "target" of MOGood, PAGood, as shown in FIG. 2. This mapping can then provide a basis for determining operating parameter modifications, e.g., how much to modify the gas mixture in each chamber, e.g., selecting an amount for an inject size on each chamber, including zero, at each inject, and the time for each inject, in order to drive the system toward a desired gas state.

According to an embodiment of the present invention applicants propose to create a simple mathematical framework for understanding the need for and results of an inject upon performance behavior in a two chambered system, e.g., a MOPA or MOPO system. At the heart of an embodiment of the present invention is the utilization of, e.g., a multi-dimensional geometric (state-space) interpretation of the gas state of the laser and the need for and amount(s) of injection(s) required. Applicants have chosen to call this the "Wheel of Fluorine," which is indicated at 10 in FIG. 2. The zones 10a-i, of the wheel 10 provide guidance as to what the gas state currently is in both the MO and the PA, relative to the desired target gas state MOGood, PAGood state 10a, not surprisingly the center of the bull's-eye formed by the wheel 10.

The rings 11, 12, including zones 10b-e in the inner ring 11 and 10f-i in the outer ring 12, of the wheel are determined by configurable parameters, and the gas state is evaluated prior to each inject.

To address the two flaws listed above, at least two new mechanisms+ have been added to existing F$_2$ monitoring and control. The first is a look-up table indexed by duty cycle, as shown in Table I. Table I has a set of bins/columns (five), with each bin/column containing three values, a reference MO energy, a reference voltage, and an inject frequency. The four internal bin boundaries, duty cycle, Emo, HV and inject frequency are Configurables and can be set empirically and may even vary over laser system life and even individually for each chamber operating life, and Table I contains representative values.

TABLE I

| | Duty Cycle (%) | | | | |
|---|---|---|---|---|---|
| | 0-15 | 16-25 | 26-45 | 46-60 | 61-100 |
| MO Energy (mJ) ref | 0.95 | 1.01 | 1.07 | 1.15 | 1.2 |
| Voltage (V) ref | 960 | 940 | 925 | 910 | 900 |
| Inject Frequency (%) | 5 | 10 | 20 | 30 | 35 |

The first two values Emo and HV can be used, e.g., just prior to each inject, e.g., to determine where the laser is on the Gas State diagram 10, as discussed in more detail below, i.e., the zone 10a-I in which the laser is operating. The third value is used, e.g., to determine the update frequency (or freshness) of the information in the bins. This can be used, e.g., to determine how the bin values are adapted over time and operating life. Table I replaces, e.g., voltage accounting methods used, e.g., in the applicants' employer's 5000 to 7000 laser products. The MO energy and voltage reference values in each duty cycle bin can provide, e.g., gas mix "anchors" which only slowly change as chamber(s) ages.

The Gas State diagram 10 can provides, e.g., a map of the pre-inject operating condition of the laser relative to a target condition provided by the reference MO energy and voltage Table 1 above.

By comparing the measured values of Emo and burst average voltage ("BAV") referred to herein as HV, just prior to starting an inject with the target values from the table, selected, e.g., by the current duty cycle, e.g., the current gas condition can be determined. For example, the combination of a moderately elevated MO energy and voltage relative to the reference values, i.e., within zone 10b, would indicate a state of MO OK, PA Lean. This indicates the need for a boost injection only in the PA chamber. A set of configurables can be used, e.g., to geometrically determine the size of the center target ring 10a, i.e., no boost indicated, the middle ring 11, single chamber boost needed—MO or PA, and the outer ring 12, dual chamber boost needed—both MO and PA. Both positive and negative boosts are allowed.

Table I lists for the five bin boundaries, 0-15, 16-25, 26-45, 46-60 and 61-100, 5 respective reference MO energies, and 5 respective reference voltages which can, e.g., all be configurables. The 5 inject frequencies, can, e.g., be diagnostics, which can, e.g., vary based upon actual operating conditions. Additional configurables may be required to provide flexibility in setting the geometry of the Gas State diagram 10. In the utilization of this gas monitoring and control system, e.g., all of the following computations are done upon successful entry to an F$_2$ inject state.

First the duty cycle at the time of the inject is computed according to the formula:

$$DC(\%) = 100 \times \frac{BurstLength}{\left(\frac{BurstLength}{RepRate} + BurstInterval\right) \times 4000}$$

where Burst Length is the number of pulses in a burst, Burst Interval is the time between bursts, Rep Rate is the laser burst repetition rate, and 4000 is the pulse repetition rate within a burst, e.g. in a 4 KHz repetition rate laser, and which may change from laser to laser according to its designed pulse repetition rate. For example the DC may be calculated periodically, e.g., every 30 seconds and, e.g., the most recent calculation may be used each time.

From this, e.g., the appropriate duty cycle bin from Table I above can be selected and, e.g., a reference Emo_ref and HVref read from the appropriate bin. These two values, along with the current values of Emo and HV, computed as the (BAV) can, e.g., be utilized to compute a pair of scaled errors:

$$\overline{E}_{MO_{inner}} = \frac{E_{MO_{current}} - E_{MO_{ref}}}{\Delta E_{MO_{inner}}} \quad \overline{E}_{MO_{outer}} = \frac{E_{MO_{current}} - E_{MO_{ref}}}{\Delta E_{MO_{outer}}}$$

$$\overline{V}_{inner} = \frac{V_{current} - V_{ref}}{\Delta V_{inner}} \quad \overline{V}_{outer} = \frac{V_{current} - V_{ref}}{\Delta V_{outer}}$$

The left, "inner" column above, can, e.g., define the boundary of the inner ring 10a region in the Gas State diagram 10, between the no boost ring 10a region, and single chamber boost 11 region. The right "outer" column can, e.g., define the boundary of the outer ring, between the middle ring 11-region one chamber boost region and the dual chamber boost region of ring 12. The two $\Delta V$'s and two $\Delta E$'s that provide the scaling for the 3 gas state regions 10a, 11 and 12 are also configurables, and may be determined empirically. In other words, the distance from the center of the multivariable gas state space coordinate system 10 for any given target (defined by the particular bin) and the outer boundary of the inner target region 10a, is a selected $\Delta Emo_{inner}$ or a selected $\Delta V_{inner}$ and the distance from the center of the multivariable gas state space coordinate system 10 for any given target (defined by the particular bin) and the outer boundary of the middle ring region 11, in the example of the preferred embodiment, is some selected $\Delta Emo_{outer}$ and some selected $\Delta V_{outer}$, which are configurables and can be selected periodically, e.g., selected empirically by experimentation, as discussed further below.

The next step according to the illustrated embodiment of the present invention can be, e.g., to determine in which region in the diagram 10 the laser is currently operating. First, e.g., a computation may be made of the radial distance from the center scaled by the inner ring and the outer ring:

$$R_{inner} = \sqrt{(\overline{E}_{MO_{inner}})^2 + (\overline{V}_{inner})^2} \quad R_{outer} = \sqrt{(\overline{E}_{MO_{outer}})^2 + (\overline{V}_{outer})^2}$$

There are, e.g., then three cases to consider:

1. ($R_{inner} < 1$), i.e., within the center circle region 10a, where no boost is necessary. In the event this is the case, then, e.g., the next two considerations may be skipped.
2. ($R_{inner} > 1$) & ($R_{outer} < 1$), i.e., in the middle region 11, where a single chamber boost is necessary. In the event that this is the case, then, e.g., the process may be to compute an angle to determine which quadrant in the state space the operating point is in, e.g., $\angle R = a \tan 2(\overline{V}_{inner}, \overline{E}_{MO_{inner}})$, from $-\pi$ to $+\pi$, and to represent a boost state by a pair, i.e., MO Boost, PA Boost, where the boost value can be, e.g., one of (−1, 0, +1). The process can then be, e.g., to determine which of four possible cases is true, i.e.:

$\pi/2 > \angle R > 0$: $1^{st}$ quadrant 10b [0, +1]  i.

$\pi > \angle R > \pi/2$: $2^{nd}$ quadrant 10e [+1, 0]  ii.

$-\pi/2 > \angle R > -\pi$: $3^{rd}$ quadrant 10d [0, −1]  iii.

$0 > \angle R > -\pi/2$: $4^{th}$ quadrant 10c [−1, 0]  iv.

In this notation, [0,+1] for quadrant 10b means that the MO is okay and the PA is lean, i.e., 0 change for the MO and an inject +1 for the PA; [+1,0], e.g., region 10d, means that the MO is lean and the PA is Okay, i.e., MO with +1 needs an injection and the PA at 0 needs none; [0,−1] for quadrant 10d means that the MO (0) is okay and the PA (−1) is rich; and [−1,0] for quadrant 10c means that the MO (−1) is rich and the PA (0) is okay.

3. ($R_{outer} > 1$), i.e., the outer ring 12 region applies, which can mean, e.g., boosts are required to both chambers, in which event, e.g., the process may be to compute an angle to determine which quadrant of the two dimensional state space the operating point is in, by $\angle R = a \tan 2(\overline{V}_{outer}, \overline{E}_{MO_{outer}})$, from $-\pi$ to $+\pi$, and to represent the boost state, e.g., by a pair, e.g., MO Boost, PA Boost, where the boost value can be one of (−1, 0, +1), and then, e.g., to determine which of four possible cases is true for the rotated quadrants (45° relative to the quadrants considered above relating to the inner ring 11 region):

$\pi/4 > \angle R > -\pi/4$: $1^{st}$ quadrant 10h [−1, +1]  v.

$3\pi/4 > \angle R > \pi/4$: $2^{nd}$ quadrant 10i [+1, +1]  vi.

$-\pi/4 > \angle R > -3\pi/4$: $3^{rd}$ quadrant 10g [−1, −1]  vii.

Otherwise: $4^{th}$ quadrant 10f [+1, −1]  viii.

Again, as above, in the quadrant 10h the MO is rich (−1) and the PA is lean (+1); quadrant 10i, the MO is lean (+1) and the PA is lean (+1); quadrant 10g the MO is rich (−1) and the PA is rich (−1); and quadrant 10f the MO is lean (+1) and the PA is rich (−1).

It will be seen that for each of the outer quadrants, e.g., quadrant 10h, the half of the quadrant that makes each MO and PA pair in the region 10h corresponds to the part of the pair that was not okay in the adjacent middle ring 11 region, i.e., region 10h is MO rich and PA lean and middle region 10e is MO rich PA okay and region 10b is MO okay and PA lean.

Once the relative gas state region has been determined, e.g., the process can be to determine the MO and PA inject sizes, which can be, e.g., computed as a combination of nominal inject size and a boost (assuming PA is the fixed inject size chamber in this example), e.g.:

MO Inject Size=MOF2consumed+[MO Boost State]×
   [MO Boost Size]

PA Inject Size=PAnominalInject+[PA Boost State]×
   [PA Boost Size]

It is possible according to an embodiment of the present invention to determine the MOF2 consumed from the current ACR and the shot count. With the ACR being a configurable laser to laser at start of life and varying over life according to updating, e.g., as discussed below. It is also possible to determine MOF2 consumed by other methods, e.g., real time $F_2$ measurements. The PanominalInject can also be, e.g., a configurable determined empirically and variable over time.

The MO and PA Boost Sizes can both be in units of kPa. This replaces previously used boost logic, which used a combination of voltage rise above reference and inject sensitivity to try to compute the amount of, e.g., PA inject to return to a target operating voltage.

The MO and PA Active Consumption Rates (ACR's) can be updated using the same boost state logic, e.g.:

MO ACR [new]=MO ACR[old]+[MO Boost State]×
   [$\Delta$ACR increment]

PA ACR [new]=PA ACR[old]+[PA Boost State]×
   [$\Delta$ACR increment]

A preferred embodiment of the present invention also contemplates, e.g., changing an adaptation mechanism for determining the reference values of Emo and HV as a function of the duty cycle discussed above. Experience has suggested to applicants that the majority of injects are performed at high duty cycle, since the active consumption component can dominate total fluorine consumption. For this reason, the duty cycle bin that contains the highest active duty cycle (e.g., 61-100) for a given laser will likely be used most often for injections. There can also be some bins that rarely, if ever, are used for injections. This can lead to stale information in these bins. The following mechanism, according to an embodiment of the present invention, is designed, e.g., to address this operational reality.

First, according to an aspect of an embodiment of the present invention, it is proposed to update the bin hit frequency, which is tracked in the bottom row of Table I. Each time an inject is initiated, the current bin is determined. The count in all bins is then modified as follows:

Inject_frequency[$i$, current bin]=(100−$Kf$)/100×Inject_frequency[$i$−1, current bin]+$Kf$     1.

Inject_frequency[$i$, all other bins]=(100−$Kf$)/100× Inject_frequency[$i$−1, all other bins]     2.

In this way, the frequency (% of injects) of the last (100/Kf) injects is tracked for use in the following adaptation step.

Next, e.g., it is contemplated to compute the current error between the target Emo and HV and the actual Emo and HV, using the reference values from the appropriate bin:

Eerror=Ecurrent−Eref

Verror=Vcurrent−Vref

These two error terms can then be used as the numerators used in the inner and outer radius calculations noted above. The following adaptation step can, e.g., only be performed if $R_{outer}$<1, i.e., in the 10$a$ ring or 11 ring regions. This can, e.g., prevent a bad cycle from corrupting the reference values that anchor the system to producing a rational gas mix.

If the error is within bounds, then, e.g., the process can be to determine which of the following two cases apply, and respond accordingly:

1. The current change is in the "highest-frequency" bin, e.g., the 46-60 bin because that is the most commonly seen duty cycle:

The process can then be, e.g., to update the reference values in all bins according to the following:

Eref [$i$, every $DC$ bin]=Eref [$i$−1, every $DC$]+$Kr$× Eerror     a.

Vref [$i$, every $DC$ bin]=Vref [$i$−1, every $DC$]+$Kr$× Verror     b.

2. the injection is using any bin other than the highest frequency bin, in which event the process can be, e.g., to update only the current bin according to the following:

Eref [$i$, current $DC$ only]=Eref [$i$−1, current $DC$]+ $Kr$×Eerror     a.

Vref [$i$, current $DC$ only]=Vref [$i$−1, current $DC$]+ $Kr$×Verror     b.

According to an embodiment of the present invention, e.g., this can serve two purposes. First, the high-frequency bin is used to set the absolute level for all of the other bins. This has benefits, e.g., as chambers age, the reference voltage in the high-frequency bin will naturally rise, and it will carry all the other bins with it. Additionally, the lower frequency bins will effectively be adjusted relative to the high-frequency bin each time they are used for an injection of gas. This allows, e.g., the shape of the HV vs. DC curve to change with time.

One additional conditional check can be imposed on the adaptation process just discussed. Since, e.g., the very first inject is usually biased by the "refill effect," adaptation could, e.g., be performed only starting at the $M^{th}$ inject, beyond the first, where M can also be a configurable. Also, because there is a higher confidence in the gas mix early in the gas life, this adaptation process could, e.g., only be performed for the first N injects, where N can also be a configurable. These two conditions reduce to:

If(this_inject>=$M$)&(this_inject<=$N$)){Do Adaptation};

Else {Skip Adaptation};

The inject count could, e.g., be incremented at the start of each inject, and should be consistent for the entire inject.

According to an embodiment of the present invention, the previously employed voltage accounting logic has been replaced by the DC-indexed table of Table I, and Wheel o' Fluorine Gas State diagram 10 discussed above. Therefore, it may no longer be necessary to track voltage changes due to duty cycle changes. Voltage accounting, however, should still be performed, because the time spent in NewOpPoint can provide a useful injection hold-off period following a duty cycle change, and the voltage and MO energy rise may still provide some valuable information. The result of voltage accounting, however, is, according to an embodiment of the present invention no longer used to update the reference voltage, which is handled by using Table I.

However, the DC-indexed table of Table I may not be used, e.g., to handle energy set point changes, which may cause changes in burst average voltage proportional to the current value of dV/dEtarget. Assuming a typical dV/dEtarget value of 20V/mJ, a 2 mJ energy target change will result in a 40V change in burst average voltage. A similar effect may be seen in Emo, and dEmo/dEtarget must also be tracked. To handle this effect, NewOpPoint state must be modified to track the approximate value of dV/dEtarget (and dE/dEmo), as follows according to an embodiment of the present invention:

1. Upon detection of an energy set point change, the process can be, e.g., to enter NewOpPoint, by latching the previous Etarget, Emo, and BAV (Etarget[entry], Emo[entry], and BAV[entry])

2. After waiting an appropriate number of pulses, e.g., 100K, depending on DC, (which maybe determined empirically and may even not change at all and be, e.g., 1000,000), then latch the new Etarget, Emo and BAV (Etarget[exit], Emo[exit], and BAV[exit]).

Thereafter the process can be, e.g., to compute the approximate value of dEtarget, dEmo and dV as:

$d$Etarget[current]=(Etarget[exit]−Etarget[entry])     i.

$d$Emo[current]=(Emo[exit]−Emo[entry])     ii.

$dV$[current]=(BAV[exit]−BAV[entry])     iii.

Then, e.g., if |dEtarget|≧0.1), compute the two ratios and update the running estimates by:

$dV\_d$Etarget[current]=$dV$[current]/$d$Etarget[current]     1.

Emo_$d$Etarget[current]=$d$Emo[current]/$d$Etarget[current]     2.

Then, e.g., update running estimates of dV/dE and dEmo/dE by:

$$dV\_dE\text{target}\_dV[i] = (1-Kd) \times dV\_dE\text{target}[i-1] + Kd \times dV\_dE\text{target}[\text{current}] \quad 1.$$

$$dEmo\_dE\text{target}\_dV[i] = (1-Kd) \times dEmo\_dE\text{target}[i-1] + Kd \times dEmo\_dE\text{target}[\text{current}] \quad 2.$$

Else, Perform no Updates

This can be done, e.g., to account for a change in a configurable, e.g., duty cycle or energy set point (average energy). It may also happen, e.g., after a new gas fill.

The system cannot always rely on an energy control system estimate of dV/dE being available, since some end users of the laser light, e.g., for microlithography may use external energy control. For this value it is only necessary to provide a ballpark estimate of dV/dE. These two values can then, e.g., be used to adjust the current values of Emo and BAV, e.g., upon injection, e.g., by converting these values back to their equivalent values at 10 mJ. Just prior to computing the scaled Emo and HV used in the inner and outer radius calculations, according to an embodiment of the present invention, Emo and HV may be scaled as follows:

$$Emo[\text{current}] = Emo[\text{current}] - (E\text{target}-10) \times dEmo/dE\text{target} \quad 1.$$

$$V[\text{current}] = V[\text{current}] - (E\text{target}-10) \times dV/dE\text{target} \quad 2.$$

It can be seen that for the nominal case of 10 mJ output energy, the correction term will be zero and have no impact on the inject algorithm. This may then account for users operating at other than the nominal 10 mJ.

Figure 3:
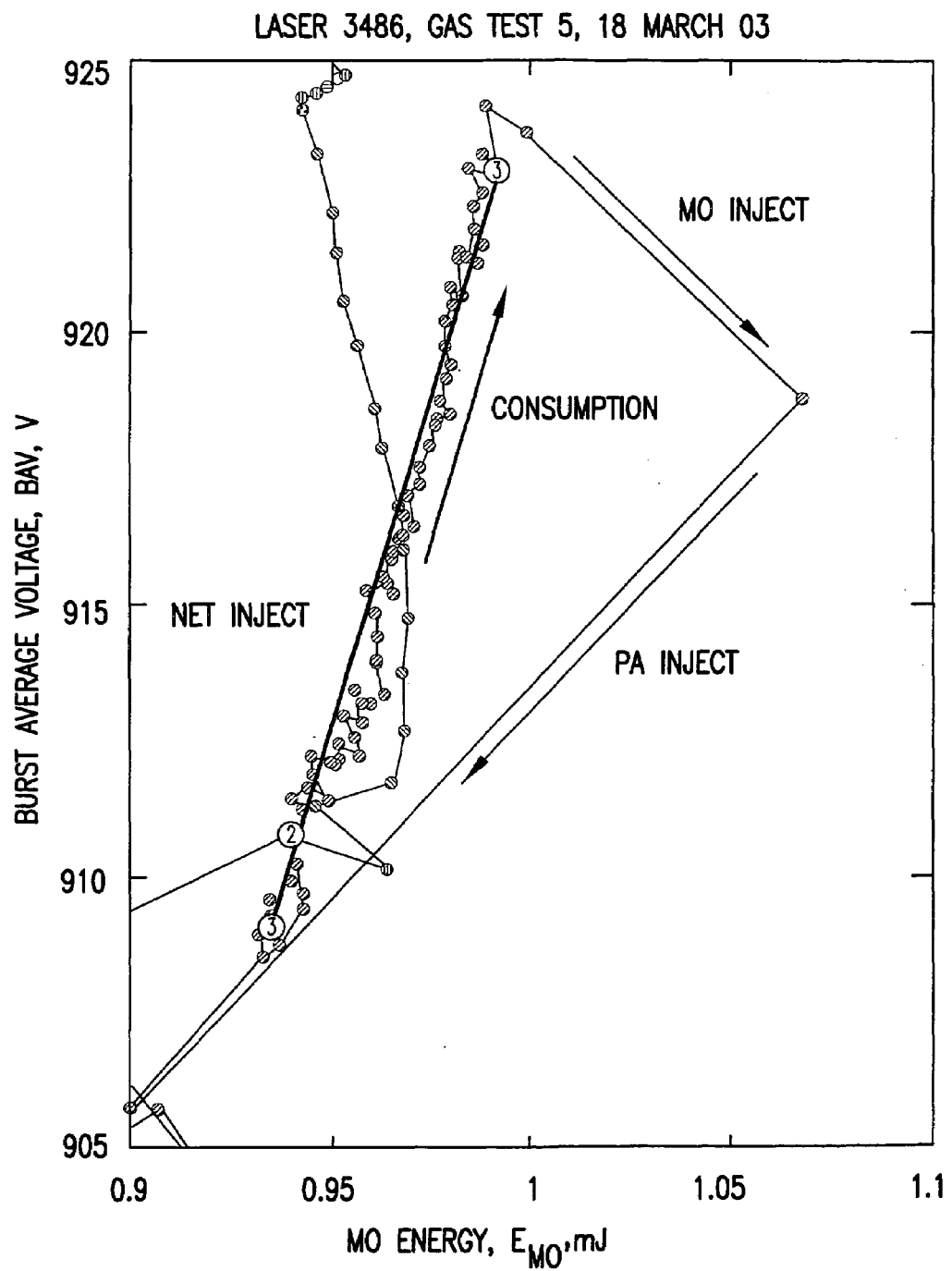
FIG. 3 shows the tracking of an operation of a two-chamber laser system in the multidimensional state space according to an embodiment of the present invention.

In operation then the system may, e.g., be operated with nominal injects of, e.g., 1.5 kPa, e.g., of $F_2$ (contained within_kPa of a nobel gas, e.g., neon), with boosts of, e.g., 0.5 kPa, multiplied by −1, 0 or +1. As shown in FIG. 3, the total $F_2$ injected, weighted by chamber—MO or PA, determines the magnitude of the injection. The net injection vector is determined by the ratio of the size of the MO injection and the PA injection, and if either is zero than the injection occurs on the PA lean to PA rich axis in FIG. 2 or the MO lean to MO rich axis in FIG. 2 respectively. The system may not have equal injection nominal unit sizes, so that a unit injection of, e.g., 1.5 kPa for the PA may correlate to a 1.0 Kpa for the MO, as shown e.g., in FIG. 4.

Figure 4:
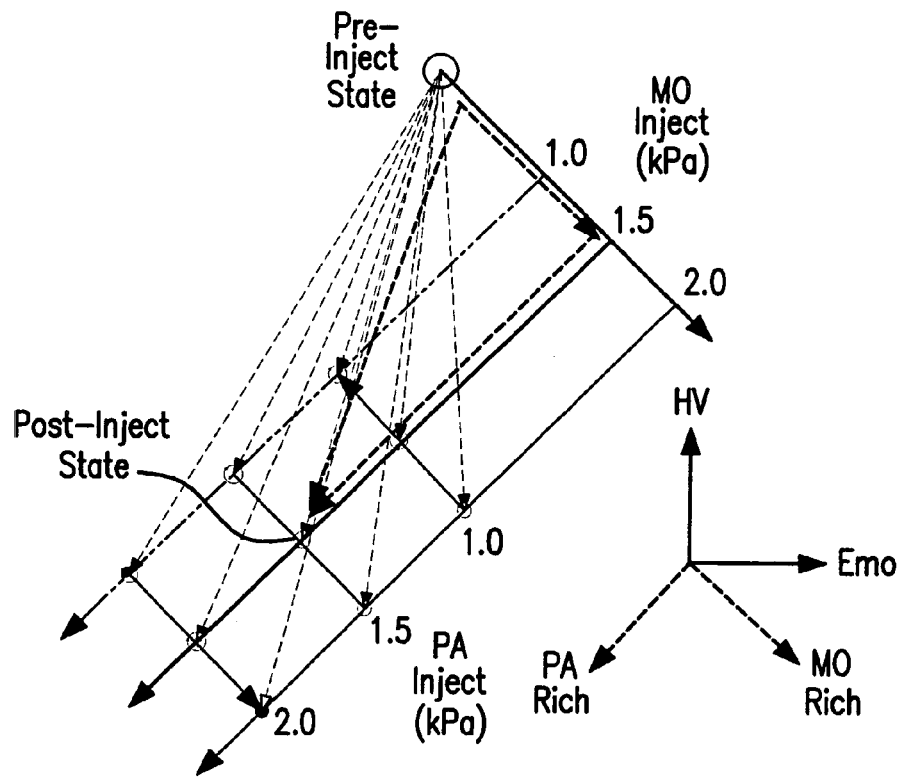
FIG. 4 shows respective changes to gas mixture in respective ones of the multiple chambers according to an embodiment of the present invention.
Figure 4A:
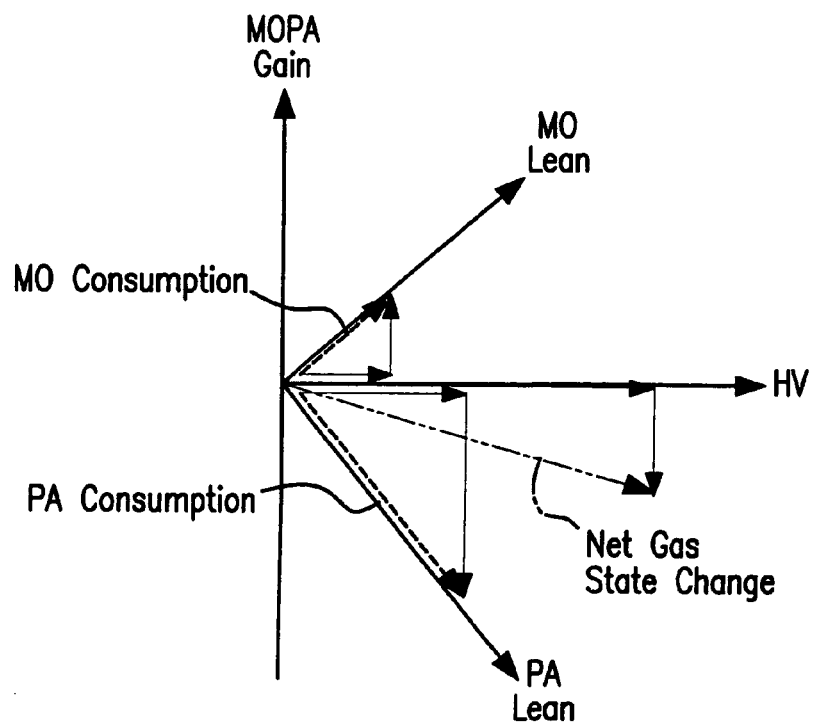
FIG. 4a shows the respective changes imposed upon the multidimensional state space according to an embodiment of the present invention.

FIG. 4a shows respective changes imposed upon the multidimensional state space according to an embodiment of the present invention similar to those shown in FIG. 4. In this Figure, which is given for illustrative purposes only and is not to scale, i.e., e.g., the net gas state change should be a vector sum of the MO consumption and PA consumption and the HV component of the net gas state change should equal the MO and PA HV components to the net change vector.

From FIG. 3 it can be seen that a previous inject brought the laser gas mixture to an operating state at or about the target, e.g., the circled 2 in FIG. 3. Gas consumption over time indicated by the dots extending toward the circled 3 in the upper center of the chart of FIG. 3, i.e., with increasing voltage (BAV) and increasing Emo, until the control system determined, e.g., by shot count, that an injection is due. The system, as noted above, computes the current location of the gas mixture in the multi-dimensional state space and determines, e.g., that the state is in the outer ring 12 at, e.g., 10, MO lean, PA lean (+1,+1) so that the MO and the PA both get the normal inject and in addition a +1 boost. The MO injection from a point on the MO lean, MO rich axis of FIG. 2 where the MO is lean toward the target of MO good (10a) is in the direction shown in FIG. 3, and as noted above may be scaled smaller than the PA inject plus boost. In addition, the PA inject along the PA lean, PA rich axis in FIG. 2, from the direction of PA lean toward the target 10a, PA good, is in the direction shown in FIG. 3. The net injection vector moves the operating point toward the circled 3 in the lower left of the chart of FIG. 3.

Due to some operating requirements in the field, e.g., end users of the laser light for micro-lithography not allowing what are called "fire through injects," certain kinds of data, e.g., at the "corner" between MO and PA injections (i.e., where the MO injection has been completed, but the injection upcoming for the PA for the same injection has not yet occurred) are not available, making the use of the net injection vector (magnitude and angle), e.g., as shown in FIG. 3, possible of determination in all cases and therefore quite useful. Thus by monitoring the laser through the inject cycles, even if the exact MO and PA injections are not always determinable, the net is. It has been found that repeatability of net injections is uncertain, e.g., due to metrology errors and other inaccuracies. However, the ability to predict both the magnitude and angle of the net change vector allows for the development of an algorithm that attempts to reach an exact gas space-state target with each injection.

Also as seen from the above, in operation, e.g., the $F_2$ injection algorithm can be based on adaptively tracking an Active Consumption Rate (ACR) of each chamber of the laser system—MO and PA. The ACR is the $F_2$ consumption rate, e.g., in kPa/Mshot, due to the number of shots having been fired, i.e., gas discharges resulting in an output laser light pulse in beam form, usually as part of a burst of pulses with some interval between bursts. ACR can vary, e.g., usually slowly with gas mix, chamber age, and duty cycle. Accurate ACR determinations can allow for purely shot based injections. An adaptation mechanism can rely on tracking the dual-chamber gas space-state of the laser, e.g., at different duty cycles. The gas space state on a multidimensional state-space coordinate system, e.g., the two dimensional Emo (mJ) v. HV (V), can be utilized to provide information about the coupling between the gas mix in each chamber, MO and PA.

Efficiency changes due to operation at different duty cycles can be handled, e.g., by a series of gas state target regions, i.e., the "wheels," i.e., ring regions 10a, 11 and 12 shown in FIG. 2. The duty cycle at the time of an injection can be used to determine which wheel/ring to compare the current measured gas state-space operating point against. "Boost logic" can be used to determine whether to perform a nominal inject to each chamber or to provide a positive or negative boost to one or both chambers.

There are two primary mechanisms for fluorine consumption in a laser system such as are under consideration in regard to embodiments of the present invention, active consumption [kPa/Mshot] due to shots fired, whereby, e.g., fluorine reacts with electrode material during discharge, and forms compounds that, e.g., coat the electrodes or drift around in the laser gas until removed, e.g., by a filter, and passive consumption [kPa/hour], e.g., due to elapsed time, during which, e.g., fluorine reacts slowly with chamber walls, gas lines, imperfect seals, etc., whether shots are being fired at the time or not. If the Active Consumption Rate (ACR) and Passive Consumption Rate (PCR) were known exactly for each chamber, one could simply count shots and time to determine how much $F_2$ has been consumed since the last injection. However, this is not the case. ACR varies, primarily with chamber age and voltage, so this value must be estimated from recent measurements. As the laser is operated, e.g., a running estimate may be made of the amount of $F_2$ consumed in each chamber, as is well known in the art, based upon current ACR and shot count and also time elapsed involved with the PCR.

A consumption target may be set, e.g., for one of the chambers (e.g., the PA by default) which may be equal to a nominal inject size, e.g., if the nominal inject size is 1.2 kPa, then the PA consumption target can be set to 1.2 kPa. When, e.g., the estimated PA consumption amount exceeds the target, an inject may be requested by the system controller (not shown).

The estimated amount of $F_2$ consumed by the other chamber (MO) may also be used to set the inject size for that chamber. For example, if the MO chamber consumes 1.35 kPa for every 1.2 kPa consumed by PA, e.g., the nominal MO inject could then be set to 1.35 at the time of the injection. This function of the controller is not modified according to the disclosed preferred embodiments of the present invention, and the present invention relates to supplementing this controller function of determining when and how much to make as nominal injections. Utilizing, e.g., adaptive determination of the ACR's for the chambers, MO and PA, e.g., can, in part, enable this supplementation. This can avoid, e.g., the need to assume the knowledge of the actual ACR for each chamber, which currently cannot be measured directly. An ACR can, according to embodiments of the present invention be inferred, e.g., from the laser gas state-space of the current operating point in the gas state-space 10, e.g., a combination of average Emo and HV (BAV), e.g., by noting where the state-space is from one inject to the next. The relative change of ACR is what matters, so ACR is adaptive, increased or decreased, depending on whether the voltage at the time of inject is higher or lower than a certain reference voltage, which reference voltage is also adapted on the basis of difference to actual voltage, e.g., at a higher time reference determination than the ACR. Therefore once the voltage reference has converged, the ACR will not change or will change very slowly, e.g., based on slowly changing passivation changes.

A separate consumption rate can be estimated for each chamber, e.g., using the following:

$$[F_2]_{consumed} = \frac{\text{(shots since inject)}}{1,000,000} \times \left(ACR \frac{[kPa]}{Mshot}\right) + \text{(hours since inject)} \times \left(PCR \frac{[kPa]}{\text{hour}}\right)$$

which may also be estimated from recent values calculated, sich it varies but slowly over time with chamber age and voltage.

Consumption results in increased average voltage to deliver the same output energy, e.g., from the PA, and consumption may also result in either increased, deceased, or unchanged MO energy, depending on the relative size of the partial derivatives in the following equation:

$$\Delta E_{MO} = \left(\frac{\partial E_{MO}}{\partial [F_2]}\right) \Delta [F_2] + \left(\frac{\partial E_{MO}}{\partial V}\right) \Delta V$$

It is not necessary to know the value of these partial derivatives, just the direction that they shift the gas state-space operating point. The "Wheel of Fluorine" provides a simple graphical interpretation of this change in the gas state-space operating point. From the plot of the gas state-space operating point, e.g. in a gas state-space defined by the coordinates x=$E_{MO}$, y=HV, e.g., as shown in FIGS. 2 and 3, along with another set of axes in the gas state-space, e.g., rotated approximately 45°, which represent chamber consumption/injection, e.g., Lean/Rich axes, i.e., as the MO uses $F_2$ the state space operating point travels outward from the center of the coordinate system, 10a in FIG. 2, toward MO Lean. One can follow, e.g., as $F_2$ is consumed in the MO chamber, this travel along the axis in the "MO Lean" direction.

Similarly a PA chamber injection, moves the gas state space operating point for the PA in the "PA Rich" direction along the PA axis orthogonal to the MO gas state axis as shown in FIG. 2. Typical consumption usually causes both MO and PA to get leaner, i.e., the gas state-space points for each moves in the HV High direction as shown in FIG. 2. A higher voltage than desired or targeted is indicated as being needed to maintain output power in the output of the PA and also in the output of the MO. A typical injection usually causes both MO and PA to get richer, i.e., the gas state-space operating point for each chamber moves in the HV Low direction on the HV High HV Low axis as shown in FIG. 3.

The Wheel of Fluorine 10 can be thought of as a sort of "compass" which can indicate which direction the gas state will go for a given change in gas mix and also which direction it needs to go from the current operating point to get to or near a selected target, e.g., 10a in FIG. 2. The system and method according to an embodiment of the present invention employs laser operating data, e.g., gas consumption and the injection cycle. The Wheel of Fluorine "target" can provide, e.g., necessary information useful in adjusting the ACR estimate. Injection is attempted in an amount matching the consumption believed to have occurred since the last injection. That is, e.g., a 1.2 kPa inject when the estimate is that consumption was 1.2 kPa. If, however, e.g., the PA ACR estimate is too low, i.e., the PA chamber is consuming $F_2$ at a higher rate than estimate, there will, at least over time, result a gas state in the PA of "PA Lean," moving the gas state operating point outward on the PA axis in the direction of "PA Lean" relative to the target region 10, e.g., point 4c shown in FIG. 5.

Figure 5:
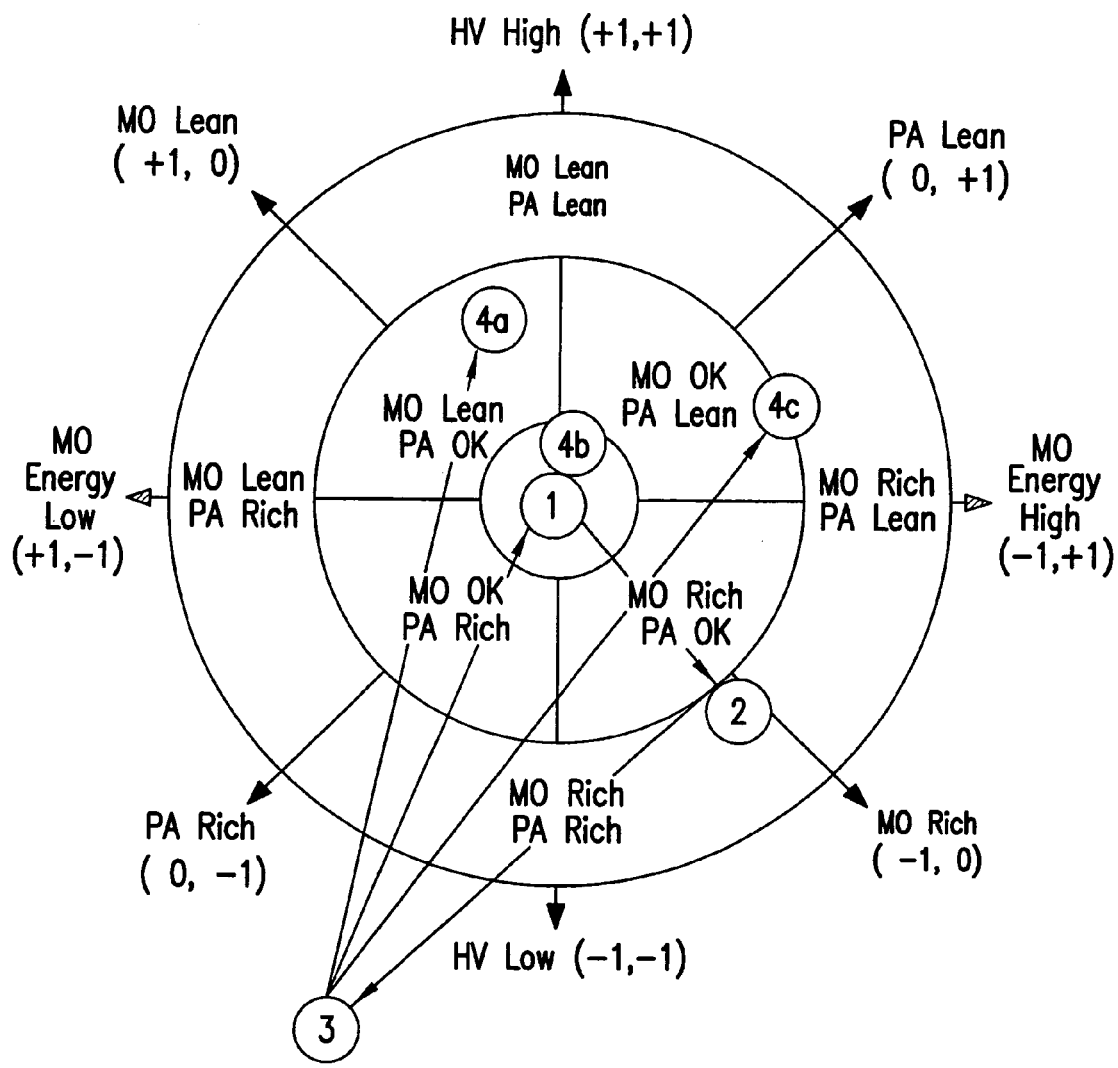
FIG. 5 shows schematically a utilization of the multidimensional state space according to an embodiment of the present invention.

The Wheel of Fluorine can also be used as a "target":

1. Assuming that the injection/consumption cycle is repeatable, it should be possible, e.g., able to follow a loop around repeatedly in Gas State space 10 as follows:
   a. starting at a gas state 1 in a circle indicated in FIG. 5, i.e., at the target MO good, Pa good, the controller can, e.g., perform an MO inject, which, e.g., puts the system gas state 2 in the circle as shown in FIG. 5, and then, e.g., follow this with a PA inject to get to state 3 in a circle shown in FIG. 5;
   b. bs the laser fires, the gas state will move in the "Lean" direction for both chambers, but could wind up at 4a, 4b or 4c as shown in the circles in FIG. 5, (or anywhere else)
   c. if the ACR estimates were correct, after an injection, the system should have arrived at the target in 10a, i.e., the point indicated by 1 in a circle in FIG. 5;

The Wheel of Fluorine "target," e.g., provides the necessary information to adjust the system ACR estimate, e.g., as follows:
   a. by definition, the system can, e.g., try to inject as much as the system believes has been consumed, e.g., since the last inject, i.e., a 1.2 kPa inject when the estimate is that is what was consumed, i.e., to point 4b;

b. if, for example, the PA ACR estimate is too low i.e., the PA chamber is consuming F2 at a higher rate than the estimate, basing the injection only on the estimate from the ACR will result in the gas mix winding up in the "PA Lean" direction relative to our target, e.g., at 4c in a circle as indicated in FIG. 5, at the next requested injection, rather than back where the system started the cycle.

c. similarly, the gas mixture could end up in the state space 10 at points 4a, e.g., if the MO ACR estimate is low and the PA estimate is okay.

d. The algorithm according to an embodiment of the present invention can then compensate for error by, e.g., increasing the PA ACR estimate if the state arrived at is 4c, i.e., to get closer to the center 10a on the next cycle, e.g., performing a positive "boost" injection to the PA chamber, e.g., to compensate for the overshoot on this cycle. That is, at a next inject request the system, e.g., employing the algorithms noted above, will compensate for by increasing the PA ACR estimate (or MO estimate, or both, as appropriate, by, e.g., adding the "boost" to the injection (or decreasing the injection according to a negative "boost" if such is indicated) to get closer to the center on the next cycle, based upon, e.g., the computed overshoot on the last cycle.

Because the laser is more efficient, i.e., lower HV is required to deliver the same output energy, at high duty cycles than at low duty cycles, one could fore to see different pre-inject gas states, i.e., target center regions 10a at different duty cycles. according to an embodiment of the present invention, the duty cycle (DC) operating space is divided up into five bins, each with its own target center, i.e., in the illustrative example, Emo and HV, with, in the example, default bins (% DC): [0→15, 16→25, 26→45, 46→60, 61→100. When an inject is requested, therefore, the current DC is used to select the appropriate bin, and that bin's stored Emo and HV are used as the Wheel of Fluorine target center to determine whether any ACR adjustments or boosts are necessary. These bin values, in turn, are slowly adapted, essentially low pass filtering, to allow for increases in nominal HV as the chambers age.

Figure 6:
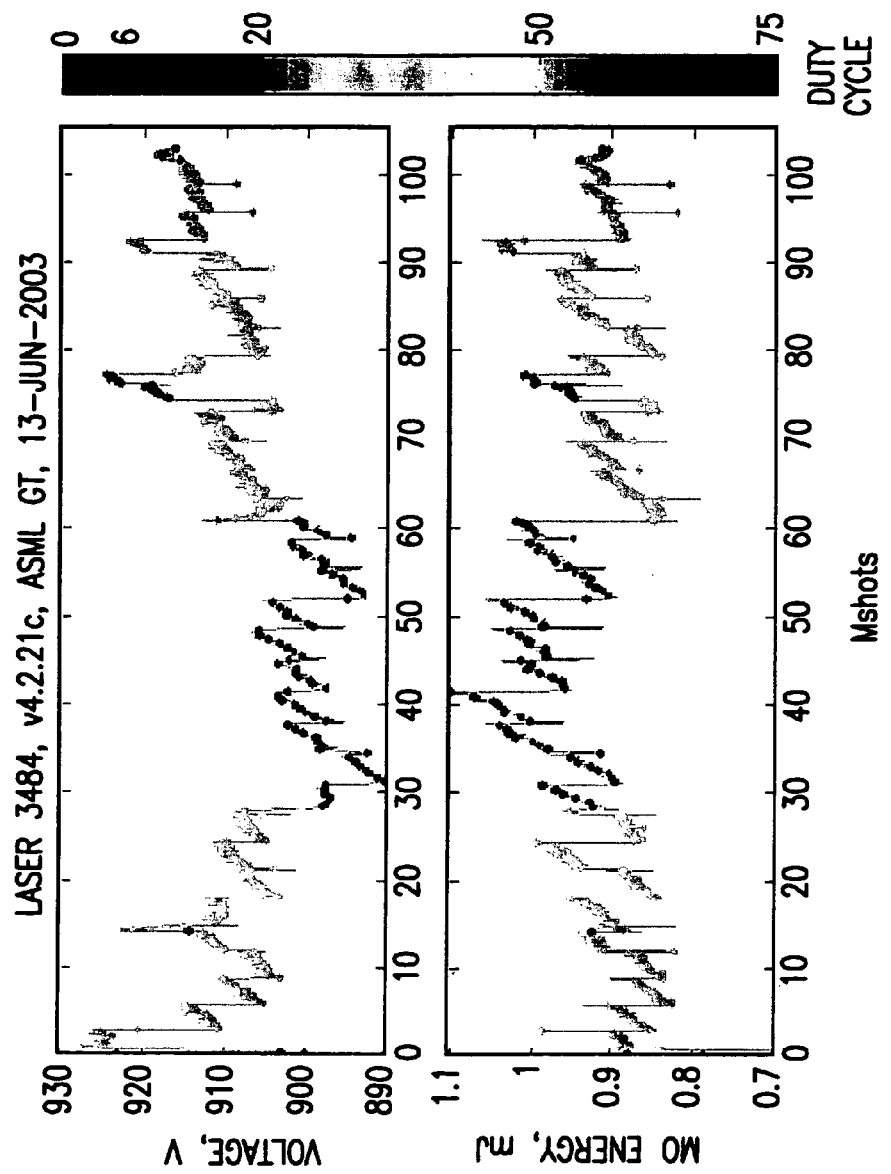
FIG. 6 shows operation of a multi-chambered gas discharge laser system with gas mixture modification according to an embodiment of the present invention.

FIG. 6 shows the results of a routine gas test over about 1B pulses. The plot is of Emo and HV vs. Shot Count. The data point markers between about 0 and 0.3B shots and between about 0.6B and 0.9B shots (excepting those at about 0.75B to 0.8B shots) are a one-duty cycle, e.g., 38%. The data point markers between about 0.3B and 0.6B are at another duty cycle, e.g., 75%. The data point markers between about 0.75B and 0.8B and between about 0.9B and 1.0B are at a third duty cycle, e.g., about 25%. It can be seen from FIG. 6 that each of the duty cycle groupings tend to stay within a defined band of both Emo and V, e.g., for the 38% duty cycle between about 905-915 volts and about 0.83-0.98 Emo, and for the 75% duty cycle groups between about 890-905 volts and about 0.88-1.3 Emo, and the about 25% duty cycle between about 910-923 volts and about 0.88 and 0.98 Emo, with some variations outside of these general bands.

Figure 7:
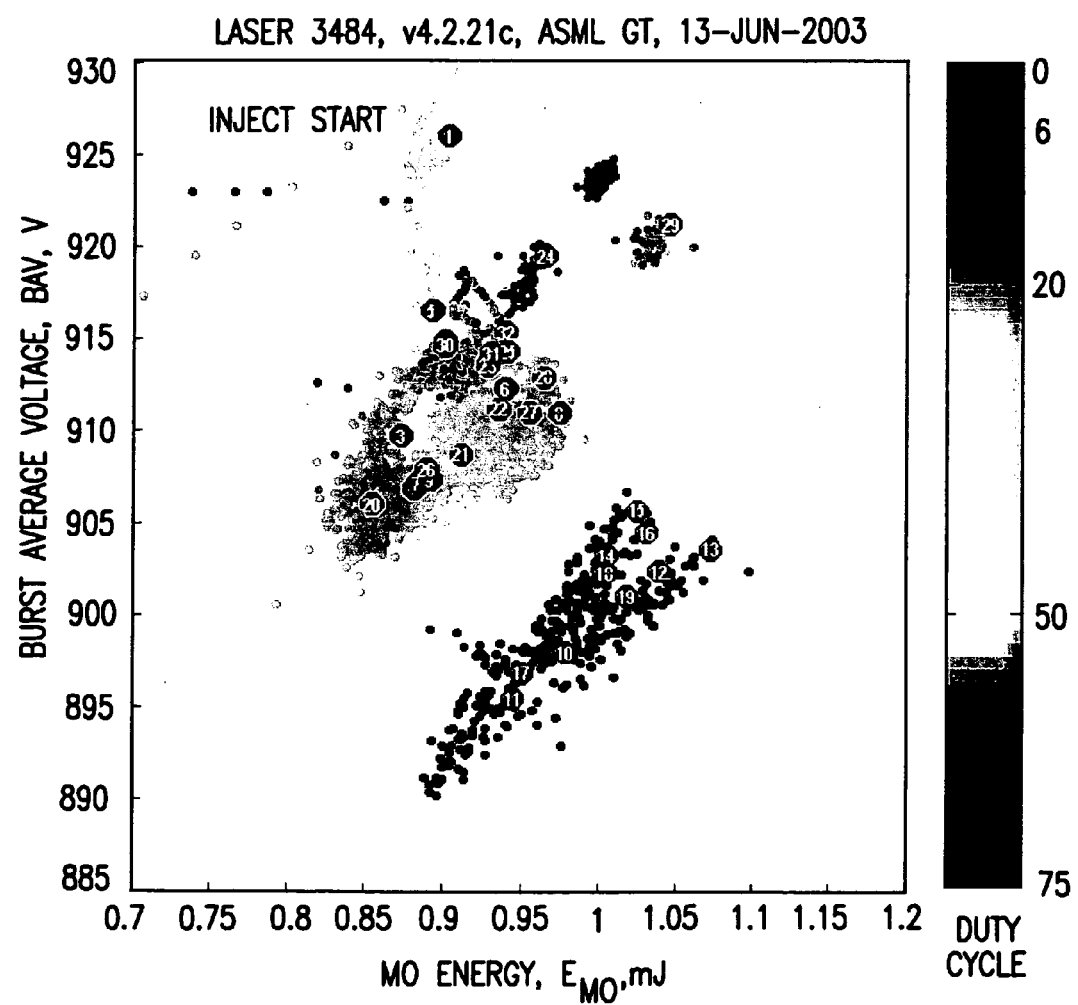
FIG. 7 shows graphically the modification of gas mixtures in multi-chambered gas discharge lasers operating at differing duty cycles and having different multidimensional state spaces according to duty cycle according to an embodiment of the present invention.
Figure 8:
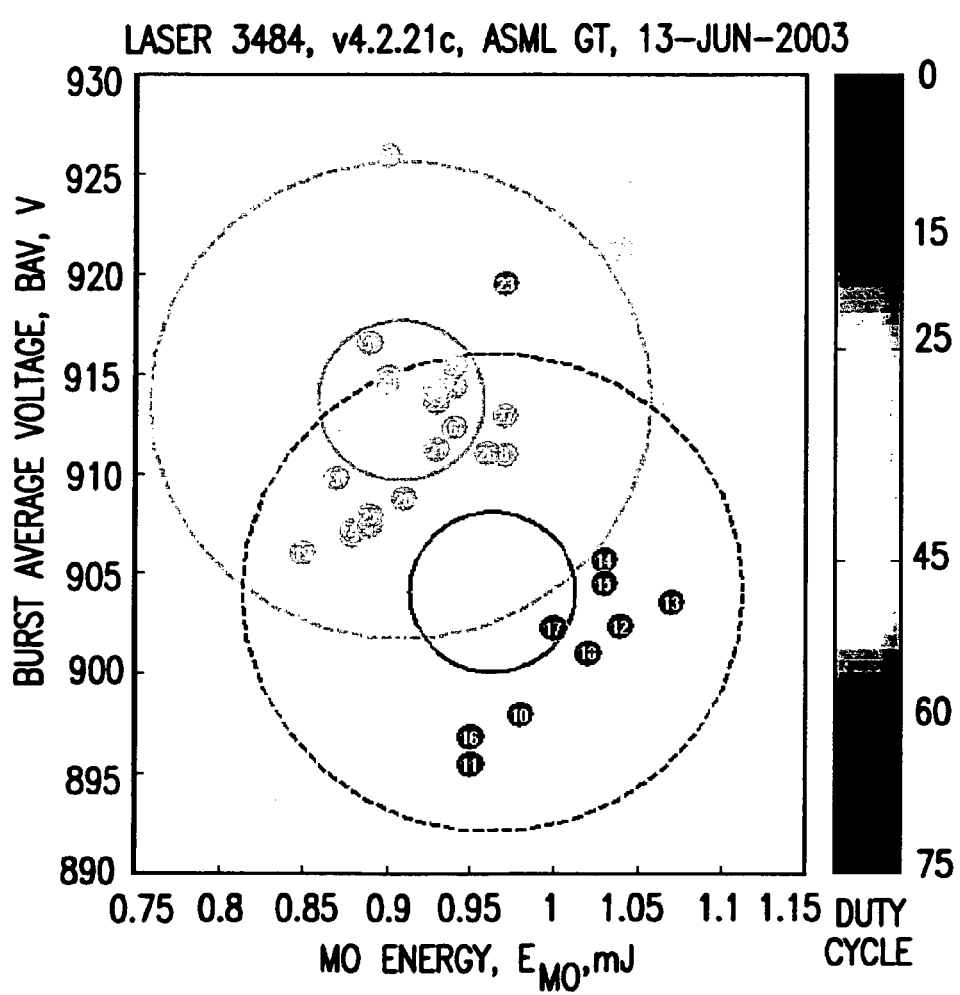
FIG. 8 shows the data points for the beginning points only of the injections tracked in FIG. 7, and the respective target state spaces.

FIG. 7 shows the results of a representative routine gas test for HV vs. Emo, indicating operating within bins 25-45% and 60-100%. The numbered balls indicate the gas state at the start of each inject. The target and inner ring for each of the bins 25%-45% and 60%-100% are also shown. As can be seen in FIG. 8, which is the same data as shown in FIG. 7 with only the inject start points shown, the data tends to be clustered together by duty cycle, on the two different duty cycle target wheels also shown in FIGS. 7 and 8, and tends to group in the target 10a or at least the inner ring 11.

In another embodiment of the present invention there are also used two measured parameters to estimate a 2 variable laser state for an $F_2$ injection algorithm. In this case the parameters, contrary to earlier systems that may have used output bandwidth, as measured in a spectral analysis module ("SAM"), the state of the laser is defined by 2 state variables, namely $F_2$ concentration and wavefront distortion. In addition the laser operating state operating point in a multidimensional state-space coordinate system can be controlled, e.g., by two different actuators, e.g., the F2 concentration, which may be done in the manner described above, and control of the wavefront, e.g., by adjustments made, e.g., by an active beam control device ("BCD"), which may be, e.g., a grating curvature apparatus in, e.g., a line narrowing module ("LNM").

Figure 9:
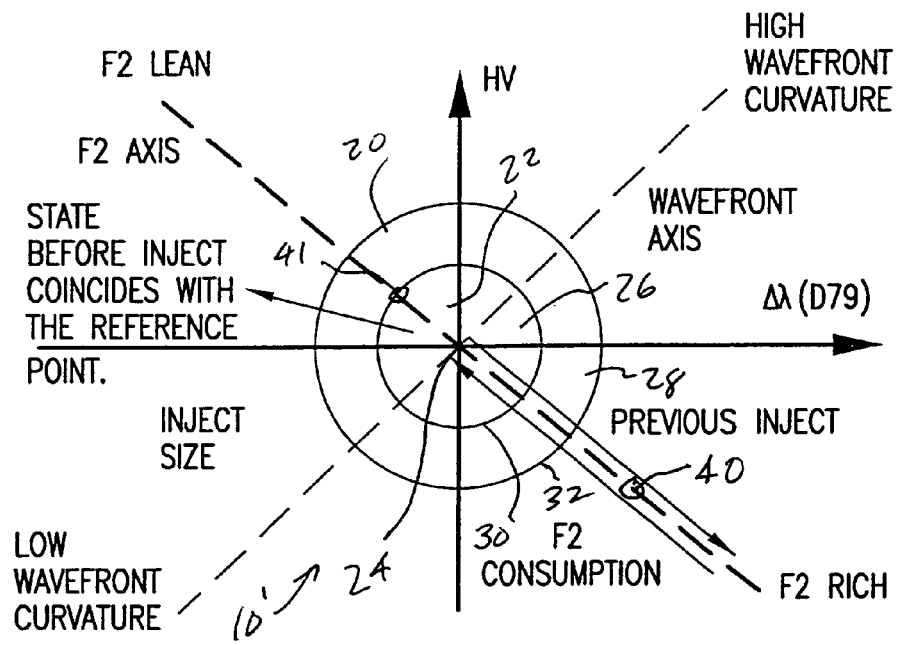
FIG. 9 shows a different multidimensional state space according to an embodiment of the present invention schematically indicating a steady state operation according to an embodiment of the present invention.

As can be seen from FIG. 9, the system according to the present embodiment of the invention also includes a wheel of zones. However, the horizontal axis of Emo replaced by λ, as indicated by the electrical output of a wavemeter sampling the laser output light pulse beam out of, e.g., the PA, and the PA gas state axis is replaced by the wavefront axis. This may be, e.g., measured by the wavemeter, e.g., as a bandwidth of the laser PA output, e.g., as a full width half max ("FWHM") measurement or other percentage of the peak of the spectrum, e.g., FWX % M, or a measure of the integrated energy within the spectrum on either side of the peak, e.g., 95%, i.e., E95, or some other integrated total energy, e.g., EX %. The wavefront axis represents relative changes in λ that are not related to $F_2$ concentration changes. Similarly, the MO axis has been replaced simply by an $F_2$ axis. This may be thought of as rotating the wheel chart shown in FIGS. 1-5 about the HV axis, to reveal in the plane of the paper a third dimension of the gas state-space, the wavefront and λ dimension. This might also be thought of as the BCD dimension since the net correction vector will now involve components of the $F_2$ injection vector and a BCD change vector.

As above with respect to FIG. 2, the state variables are approximately rotated by 45° with respect to the measurement axes for appropriate choice of scaling factors, the scaling being determined empirically by experimentation, e.g., Δλ and HV. Adjustments are made to the $F_2$ concentration, in both the MO or PA according to the above description. This may be thought of as the MO and PA changes projected onto one axis, which is the single $F_2$ axis in FIGS. 9 and 10. can be made, e.g., by $F_2$ injects to correct the component of the error parallel to the $F_2$ axis as noted above. In this case the system can also, e.g., use BCD adjustments to correct the component of the error parallel to the wavefront axis, i.e., high wavefront curvature to low wavefront curvature.

According to an embodiment of the present invention, e.g., in the $F_2$/BCD wheel case a steady-state may be characterized by the following conditions:

1. The ACR and Voltage reference for all duty-cycle bins are known with sufficient accuracy; and
2. There is no distortion of the wavefront.

In steady-state operation, e.g., the laser operating state moves in the multidimensional state space along the $F_2$ axis. $F_2$ Injects can occur along the semi-axis, by definition of that axis $F_2$ lean to $F_2$ rich. As the laser consumes $F_2$, the laser operating state moves in the multidimensional state-space back to the reference point, following the same semi-axis ($F_2$ rich to $F_2$ lean, as shown by the arrow in FIG. 10. When, e.g., the ACR is well known, e.g., the inject can be requested when the inject is back at the reference point region 10*a*'. No distortion of the wavefront occurs in steady-state, so that there is no component of the error which is parallel to the wavefront axis.

When the ACR or the voltage reference are completely adapted, the laser state before the inject will still lie along the $F_2$ semi-axis but it may over or under-shoot. Both ACR and Vref will, e.g., adapt to their true value using a mechanism similar to that in the LoFi algorithm, which was an earlier version of a Line of Fluorine for a single chamber laser. The boost logic, e.g., can also be unchanged from that noted above with respect to the Wheel of Fluorine algorithm. However, the error used in the adaptation and boost equation can be different, i.e., it can be based on the error between the gas operating state as indicated in FIG. 10 before an inject and a reference state projected on the $F_2$ axis, e.g., as indicated by the $F_2$ injection arrow in FIG. 10, e.g., with no distortion of the wavefront assumed in this example.

When the "wavefront" component of the error is non-zero, a BCD correction can be applied. This adjustment can occur in closed loop before the inject between the 10K average of the bandwidth and the BCD position. The algorithm can be selected to find a minimum of the wavefront error. this relates to shifting the generally parabolic relationship of the BW by changes in curvature, e.g., of the grating, to a different minimum point by the change in the curvature of the grating, e.g., to adapt to the changing wavefront.

Those skilled in the art will understand that the present invention is subject to many variations and modifications that will be well known and appreciated by those skilled in the art. For example, the bins may be arranged in other than the ranges noted, e.g., by a specific duty cycle and selection o f the bin may be made by proximity of the calculated duty cycle to the possible choices identifying each bin or alternatively interpolation may be done between the two adjacent closest bin according to the proximity of the actual duty cycle to the value identifying each such bin. It will also be understood that in three or higher dimensions the "rings" of the wheel will be spheres or such other multidimensional state space structures as are appropriate. It will also be understood by those skilled in the art that the number of rings/spheres or other multidimensional region-defining shapes, as the limit approached infinity, may represent unique curves or surfaces having, e.g., a defined vector distance from the origin, and/or may represent many more that just the several boost values of the presently preferred embodiments and/or be able to be interpolated between adjacent regions to arrive at what approaches a continuum of boost values determined from the position of the operating point in the state-space coordinate system, and region as used in the specification of the present application is intended to encompass regions in a state-space coordinate system that may, e.g., lie in a three dimensional coordinate system but not have three dimensions, e.g., the pints on the surface of a sphere.

Figure 10:
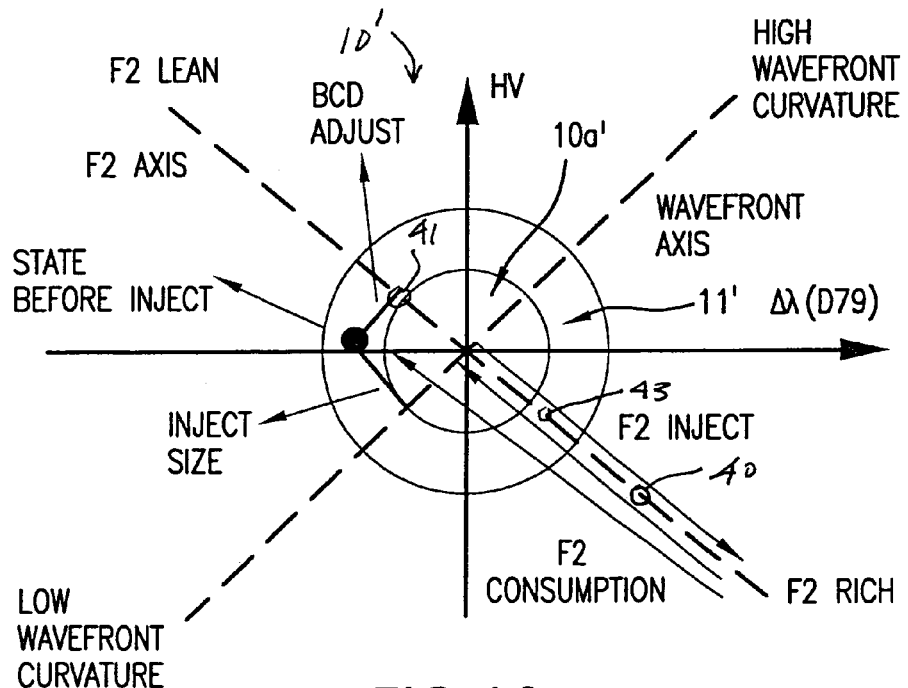
FIG. 10 shows the state space of FIG. 9 schematically showing an operation where there is a need for a change in a parameter other than gas mixture, in addition to gas mixture, according to an embodiment of the present invention.

In yet another embodiment of the present invention also described in relation to FIGS. 9 and 10, there are also used two measured parameters to estimate a two variable laser state for an $F_2$ injection algorithm. In this case the parameters used to define a state of the laser operation, may be $F_2$ concentration as determined from HV and bandwidth, as shown in FIGS. 9 and 10 on, respectively, the vertical and horizontal axes respectively and for the case where the determination of the $F_2$ to be injected is not also a function of the wavefront being out of steady state. The laser operating state operating point in the multidimensional state-space coordinate system, including HV and $\lambda$, can be controlled, e.g., by only the F2 concentration, which may be done in a manner similar to that described above, and control of the wavefront.

As can be seen from FIG. 9, the system according to the present embodiment of the invention also includes a wheel of zones. However, the horizontal axis of Emo replaced by $\lambda$, as indicated by the electrical output of a wavemeter sampling the final laser output light pulse beam and the PA gas state axis is replaced by the wavefront axis. This may be, e.g., measured by the wavemeter, e.g., as a bandwidth of the laser output, e.g., as a full width half max ("FWHM") measurement. The wavefront axis represents relative changes in $\lambda$ that are not related to $F_2$ concentration changes, i.e., those along the $F_2$ axis, i.e., from $F_2$ rich to $F_2$ lean, which axis replaces the MO axis.

As above with respect to FIG. 2, the state variables, e.g., the $F_2$ axis is approximately rotated by 45° with respect to the measurement axes for appropriate choice of scaling factors, here HV and $\lambda$, the scaling being-determined empirically by experimentation, e.g., using $\Delta\lambda$ and HV.

According to this embodiment of the present invention, e.g., in the $F_2$/BCD wheel case a steady-state may be characterized by the following conditions:

1. The ACR and Voltage reference for all duty-cycle bins are known with sufficient accuracy; and
2. There is no distortion of the wavefront.

In steady-state operation, e.g., the laser operating state moves in the multidimensional state space along the $F_2$ axis. $F_2$ Injects can occur along the semi-axis, by definition of that axis $F_2$ lean to $F_2$ rich. As the laser consumes $F_2$, the laser operating state moves in the multidimensional state-space back to the reference point, following the same semi-axis ($F_2$ rich to $F_2$ lean, as shown by the arrow in FIG. 10), and as with the case of Emo and HV noted above, tracked by changes in HV and $\lambda$. When, e.g., the ACR is well known, e.g., the inject can be requested when the inject is back at the reference point region 10*a*'. No distortion of the wavefront occurs in steady-state, so that there is no component of the error which is parallel to the wavefront axis.

When the ACR or the voltage reference are adapted, the laser state before the inject will still lie along the $F_2$ semi-axis but it may over or under-shoot, as is shown in FIG. 10, e.g., for the case where the BCD adjust is not present in the formulation. Both ACR and Vref will, e.g., adapt to their true value using a mechanism similar to that in the LoFi algorithm, which was an earlier version of a Line of Fluorine for a single chamber laser using only the change in voltage and therefore a one dimensional state space. The boost logic, e.g., can also be unchanged from that noted above with respect to the Wheel of Fluorine algorithm. However, the error used in the adaptation and boost equation can be different, i.e., it can be based on the error between the gas operating state as indicated in FIG. 10 before an inject and a reference state projected on the $F_2$ axis, e.g., as indicated by the $F_2$ injection arrow in FIG. 10, e.g., with no distortion of the wavefront assumed in this example.

According to aspects of another embodiment of the present invention, the present invention takes into account that there are a number of possible operating states the laser system could be in defining several gas states, e.g., three relative gas states (Lean, Good, Rich). With "good" meaning at or about some target operating parameter point, which may vary over the life of the laser, e.g., as changes in the electrodes, or other effects on the discharge, cause, e.g., the charging voltage on the peaking capacitors to rise in order to maintain the desired output laser light pulse beam power requirements, which are generally dictated by the end users of the light and must be met, "lean" meaning out of range with the partial pressure low, and "rich" meaning out of range with the partial pressure high. Creating a table of combinations (Good, Lean, Rich, Very Lean, Very Rich) and combining this with possible indicators of operating performance, e.g., peaking capacitor charging voltage ("HV"), output bandwidth and the like, it is possible to list in table form what the various indicators should look like under the above combinations.

From this applicants have determined that, while other combinations may also be possible, HV and BW are believed to be the most reliable pair. It is possible according to aspects of an embodiment of the present invention to arrange the variables for purposes of consideration into, e.g., a geometric interpretation of the results, e.g., the utilization of a multidimensional state space. Such a multi-dimensional state space may be, e.g., a two-dimensional state space for the expression of the gas control problem, e.g., with Cartesian coordinates x=BW and y=HV. Applicants then overlaid these coordinates a "gas axis" of the gas discharge laser, e.g., rotated by 45° as is shown, e.g., in FIG. 9.

According to aspects of an embodiment of the present invention applicants propose to provide a simple state-space representation in a multidimensional state-space, e.g., the two dimensional state-space, of the gas states in the gas discharge laser. The system and process according to an embodiment of the present invention can then provide for a mapping from measurable quantities, e.g., BW and HV, to a gas state (Lean, Good, Rich, Very Lean, Very Rich) within one of the possible combinations, including a center "target", as shown, e.g., in FIGS. 9 and 10. This mapping can then provide a basis for determining operating parameter modifications, e.g., how much to modify the gas mixture, e.g., selecting an amount for an inject size including zero, at each inject, and/or the time for each inject, in order to drive the system toward a desired gas state.

According to an embodiment of the present invention applicants propose to create a simple mathematical framework for understanding the need for and results of an inject upon performance behavior. At the heart of an embodiment of the present invention is the utilization of, e.g., a multi-dimensional geometric (state-space) interpretation of the gas state of the laser. e/g/. a single chamber excimer or molecular fluorine gas discharge resonant oscillator laser, and the need for and amount(s) of injection(s) required. Applicants have chosen to call this the Adaptable Fluorine Injection or AFI.

As shown in FIG. 9, the zones, e.g., zone 20 $F_2$ Very Lean (the outer two dimensional half-ring shaped region along the rotated $F_2$ consumption axis in the $F_2$ lean direction), zone 28, $F_2$ Very Rich (the outer two dimensional half-ring shaped region along the rotated $F_2$ consumption axis in the $F_2$ rich direction) zone 22, $F_2$ Lean (the inner two dimensional half-ring shaped region along the $F_2$ consumption axis in the lean direction) and zone 26 $F_2$ Rich (the inner two dimensional half-ring shaped region along the $F_2$ consumption axis in the rich direction) and zone 24 $F_2$ good (the circular two dimensional region surrounding the origin of the coordinate system). The position of the operating point of the laser, based on the values of, e.g., HV and $\Delta\lambda$ (BW) and the algorithm described below, in the coordinate system 10 provides guidance as to what the gas state currently is.

The inner circle 24 and rings 30, 32, including zones 20-28 of the wheel, may be determined by configurable parameters, and the gas state may be evaluated prior to each inject. The configurable parameters may be optimized, e.g., empirically, by the user based, e.g., on measured performance parameters for a particular class of laser (ArF, KrF, etc.) and configuration of such a laser in such a class of lasers, for which a control system according to aspects of the present invention, including adaptive fluorine injections ("AFI").

Applicants propose at least two new mechanisms added to existing $F_2$ monitoring and control. The first is a look-up table indexed by duty cycle, as shown in Table II. Table II has a set of bins/columns (, e.g., five), with each bin/column containing three values, a reference BW, a reference voltage, and an inject frequency. The four internal bin boundaries, duty cycle, BW, HV and inject frequency may be used. Table II contains representative values. The value for duty cycle may extend to 140% since energy duty cycle, as defined below, may be employed as opposed to the shot count duty cycle discussed above.

TABLE II

|  | Duty Cycle/Energy Duty Cycle(%) | | | | |
| --- | --- | --- | --- | --- | --- |
|  | 0-15 | 16-25 | 26-45 | 46-60 | 61-140 |
| BW (pm) ref | 28 | 29 | 30 | 31 | 32 |
| Voltage (V) ref($V_{nominal}$) | 995 | 980 | 940 | 930 | 925 |
| Inject Frequency (%) | 5 | 10 | 20 | 30 | 35 |
| Max Duty Cycle | 15 | 25 | 45 | 60 | 140 |

The first two values BW and HV can be used, e.g., just prior to each inject, e.g., to determine where the laser is on the Gas State diagram 10' as shown, e.g., in FIGS. 9 and 10, as discussed in more detail below, i.e., the zone 20-28 in which the laser is operating. The third value may be used, e.g., to determine the update frequency (or freshness) of the information in the bins. This can be used, e.g., to determine how the bin values are adapted over time and operating life. The BW and voltage reference values in each duty cycle bin can provide, e.g., gas mix "anchors" which only slowly change as the chamber ages.

The Gas State diagram 10' can provide, e.g., a map of the pre-inject operating condition of the laser relative to a target condition provided by the reference BW and HV, e.g., as shown in Table II above.

By comparing the measured values of BW and HV, e.g., burst average voltage ("BAV") or X-shot rolling average voltage, referred to herein as HV, just prior to starting an inject with the target values from the table, selected, e.g., by the current duty cycle, e.g., the current gas condition can be determined. For example, the combination of a moderately elevated BW and voltage relative to the reference values and the ratio of $\Delta$BW to $\Delta$HV, e.g., above the BW (High, Low) rotated axis 50, i.e., to the right of the vertical HV axis and above the horizontal BW axis, and above or below the BW rotated axis 52 that is orthogonal to the $F_2$ consumption axis 50, i.e., either within that portion of zone 22 or that portion of zone 26, would indicate a state of the gas consumption since the last inject that has resulted in the $F_2$ concentration being on the Rich or Lean side of the rotated bandwidth axis 52, but not in the Very Lean zone 20 or the Very Lean zone 28. The laser state operating position being in the Very Lean zone 20 or the Very Rich Zone 28 might result, e.g., from a slightly more elevated HV error and/or BW error from the origin of the coordinate system and also in the upper right quadrant of the coordinate system 10'. Similarly, HV below a selected reference value and/or BW below a selected reference value or a combination of one or the other can place the laser operating state in one of the other three quadrants of the coordinate system 10' and also the ratio of ΔBW to ΔHV can determine if the position if in the $F_2$ rich or $F_2$ Lean portions of the AFI wheel.

This positioning of the operating point, e.g., in zone 22 indicates the need for a boost injection of some amount over the normal injection since the position of the operating point indicates the $F_2$ concentration in the laser is in the Lean zone 22. A set of configurables can be used, e.g., to geometrically determine the size of the center target ring comprising zones 22 and 26, i.e., a first level of boost indicated, and the outer ring comprising zones 20, 28 with a higher level of boost needed, and the sizes of the boosts. Both positive and negative boosts are allowed, with the former occurring when the operating point is in the zones 20 and 22 and the latter when the operating point is in the zones 26, 28.

It will further be understood that according to aspects of an embodiment of the present invention the determination of the boost amount may be made, e.g., from consideration of the values of $R_{outer}$ and $R_{inner}$, such that, when $|R_{inner}|<1$ and $|R_{outer}|<1$ then the boost value is equal to 0, and when "$R_{inner}|>1$ and $|R_{outer}|<1$ the value of the boost is ±1 and when $|R_{inner}|>1$ and $|R_{outer}|>1$ the boost value is ±2, with the sign determined by the position of the operating point of the laser relative to the $F_2$ Rich/Lean axis. The Boost Value may be utilized to determine an Inject size, e.g., according to the following:

Inject Size=Target Inject size*(1+Boost Value [0, ±1, ±2]/2 where Inject size may be, e.g., some preselected inject amount, that may, e.g., change over laser life.

It is possible according to an embodiment of the present invention to determine the $F_2$ estimated consumption since last inject, and therefore the nominal inject amount, from the current ACR and the shot count. With the ACR being a configurable laser to laser at start of life and varying over life according to updating, e.g., as discussed below. It is also possible to determine $F_2$ consumed by other methods, e.g., real time $F_2$ measurements. The normal inject target injection amount may also take into consideration time since the last inject and the Passive Consumption Rate ("PCR") times the elapsed time, though in normal operation and absent a preceding long off time, the ACR will effectively dominate the estimate of consumption since the last inject. For example the estimated consumption may be calculated by adding (ACR×shot count since last injection)+(PCR× elapsed time since last injection). ACR may be updated, e.g., by creating a new ACR for the next injection cycle $ACR_N$ that is equal to the ACR for the current (Oust completed) inject cycle ("$ACR_{N-1}$") plus some constant times (a selected ACR increment) multiplied by, e.g., the value of the boost state computed for the just completed inject cycle. Similarly the inject target size may be updated after each injection according to the formula Inject size for the Nth inject is equal to the Inject size for the Nth-1 inject times some constant times the Inject Size for the last inject over some constant, e.g., 2 times the boost state for the Nth-1 inject.

The Boost Size can be in units of kPa.

A preferred embodiment of the present invention also contemplates, e.g., changing an adaptation mechanism for determining the reference values of BW and HV as a function of the duty cycle discussed above. Experience has suggested to applicants that the majority of injects are performed at high duty cycle, since the active consumption component can dominate total fluorine consumption. For this reason, the duty cycle bin that contains the highest active duty cycle (e.g., 61-100) for a given laser which may be used most often for injections. There can also be some bins that rarely, if ever, are used for injections. This can lead to stale, i.e., inaccurate or obsolete, information in these bins. This operational reality can be addressed as discussed above, and in this way, the frequency (% of injects) of the last (100/Kf) injects is tracked for possible use in the following adaptation step described above, only for BW and HV rather than $E_{MO}$ and HV.

Next, e.g., it is contemplated to compute the current error between the target BW and HV and the actual BW and HV, using the reference values from the appropriate bin:

$BWerror=BWcurrent-BWref$ $Verror=Vurrent-Vref$

The process may then be to determine which of the following two cases apply, and respond accordingly:

1. The current change is in the "highest-frequency" bin, e.g., the 46-60 bin because that is the most commonly seen duty cycle:

The process can then be, e.g., to update the reference values in all bins according to the following:

a. $BWref [i, \text{every } DC \text{ bin}]=BWref [i-1, \text{every } DC]+Kr \times BWerror$ b. $Vref [i, \text{every } DC \text{ bin}]=Vref [i-1, \text{every } DC]+Kr \times Verror$ 2. The injection is using any bin other than the highest frequency bin, in which event the process can be, e.g., to update only the current bin according to the following:

a. $BWref [i, \text{current } DC \text{ only}]=BWref [i-1, \text{current } DC]+Kr \times BWerror$ b. $Vref [i, \text{current } DC \text{ only}]=Vref [i-1, \text{current } DC]+Kr \times Verror$ According to an embodiment of the present invention, e.g., this can serve two purposes. First, the high-frequency bin is used to set the absolute level for all of the other bins. This has benefits, e.g., as the laser chamber ages, the reference voltage in the high-frequency bin will naturally rise, and it will carry all the other bins with it. Additionally, the lower frequency bins will effectively be adjusted relative to the high-frequency bin each time they are used for an injection of gas. This allows, e.g., the shape of the HV vs. DC curve to change with time.

One additional conditional check can be imposed on the adaptation process just discussed. Since, e.g., the very first inject is usually biased by the "refill effect," adaptation could, e.g., be performed only starting at the $M^{th}$ inject, beyond the first, where M can also be a configurable. Also, because there is a higher confidence in the gas mix early in the gas life, this adaptation process could, e.g., only be performed for the first N injects, where N can also be a configurable. These two conditions reduce to:

If(this_inject≧M)&(this_inject≦N)){Do Adaptation};

Else {Skip Adaptation}.

The optimum settings for M and N may be part of the overall algorithm according to aspects of an embodiment of the present invention.

According to aspects of an embodiment of the present invention the software may transition into New Op Point for a time, e.g., if an energy change is detected (based upon 10K average energy), and may also compensate the measured voltage based upon the actual energy and dE/dV at the time of an inject decision.

Other changes may be a change in a configurable, e.g., duty cycle or energy set point (average energy). It may also happen, e.g., after a new gas fill. The value of Average Voltage for the last 10K shots may be used in place of BAV.

The system cannot always rely on an energy control system estimate of dV/dE being available, since some end users of the laser light, e.g., for microlithography, may use external energy control. For this value it is only necessary to provide an approximate value of dV/dE (dV/dE nominal). These two values can then, e.g., be used to adjust the current values of BW and BAV, e.g., upon injection, e.g., by converting these values back to their equivalent values at 10 mJ. Just prior to computing the scaled BW and HV used in the inner and outer radius calculations, according to an embodiment of the present invention, BW and HV may be scaled as follows:

BW[current]=BW[current]−(Etarget−10)×dBW/dEtarget    1.

V[current]=V[current]−(ETarget−ENominal)×dV/dENominal    2.

It can be seen that for the nominal case of output energy, the correction term will be zero and have no impact on the inject algorithm. This may then account for users operating at other than the nominal energy.

Also as seen from the above, in operation, e.g., the $F_2$ injection algorithm can adaptively track an Active Consumption Rate (ACR) of the laser system. The ACR is the $F_2$ consumption rate, e.g., in kPa/Mshot, due to the number of shots having been fired, i.e., gas discharges resulting in an output laser light pulse. ACR can vary, e.g., usually slowly with gas mix, chamber age, and duty cycle. Accurate ACR determinations can allow for purely shot based injections. An adaptation mechanism can rely on tracking of the laser, e.g., at different duty cycles.

Efficiency changes due to operation at different duty cycles can be handled, e.g., by a series of gas state target regions, i.e., the "wheels," i.e., ring regions 20-28 shown, e.g., in FIG. 9. The duty cycle at the time of an injection can be used to determine which wheel/ring to compare the current measured gas state-space operating point against. "Boost logic" can be used to determine what to inject into the laser.

There are two primary mechanisms for fluorine consumption in a laser system such as are under consideration in regard to embodiments of the present invention, active consumption [kPa/Mshot] due to shots fired, whereby, e.g., fluorine reacts with electrode material during discharge, and forms compounds that, e.g., coat the electrodes or drift around in the laser gas until removed, e.g., by a filter, and passive consumption [kPa/hour], e.g., due to elapsed time, during which, e.g., fluorine reacts slowly with chamber walls, gas lines, imperfect seals, etc., whether shots are being fired at the time or not. If the Active Consumption Rate (ACR) and Passive Consumption Rate (PCR) were known exactly for the laser, one could simply count shots and/or time, e.g., at one or more duty cycles, to determine how much $F_2$ has been consumed since the last injection. However, this is not the case. ACR varies, primarily with chamber age and voltage, so this value must be estimated from recent measurements. As the laser is operated, e.g., a running estimate may be made of the amount of $F_2$ consumed in the laser, as is well known in the art, based upon current ACR and shot count and also time elapsed involved with the PCR.

A consumption target may be set, e.g., which may be equal to a nominal inject size, e.g., if the nominal inject size is 1.2 kPa, then the consumption target can be set to 1.2 kPa.

When, e.g., the estimated consumption amount exceeds the target, an inject may be requested by the system controller (not shown).

Utilizing, e.g., adaptive determination of the ACR's for the laser, e.g., can, in part, enable this supplementation. An ACR can, according to embodiments of the present invention be inferred, e.g., from the laser gas state-space of the current operating point in the gas state-space 10', e.g., a combination of average BW and HV, e.g., by noting where the state-space is from one inject to the next. The relative change of ACR is what matters, so ACR is adaptive, increased or decreased, depending on whether the voltage at the time of inject is higher or lower than a certain reference voltage, which reference voltage is also adapted on the basis of difference to actual voltage, e.g., at a higher time reference determination than the ACR. Therefore once the voltage reference has converged, the ACR will not change or will change very slowly, e.g., based on slowly changing passivation changes.

A consumption rate can be estimated for the laser chamber, e.g., using the following:

$$[F_2]_{consumed} = \frac{\text{(shots since inject)}}{1{,}000{,}000} \times \left(ACR \frac{[kPa]}{Mshot}\right) + \text{(hours since inject)} \times \left(PCR \frac{[kPa]}{hour}\right)$$

which may also be estimated from recent values calculated, since it varies but slowly over time with chamber age and voltage.

Consumption results in increased average voltage to deliver the same output energy and consumption may also result in either increased, deceased, or unchanged output energy. It is only necessary to know the direction that the gas state-space operating point shifts, e.g., $$\Delta E = \left(\frac{\partial E}{\partial [F_2]}\right)\Delta[F_2] + \left(\frac{\partial E}{\partial V}\right)\Delta V$$

The state space map of, e.g., FIG. 9 provides a simple graphical interpretation of this change in the gas state-space operating point. From the plot of the gas state-space operating point, e.g. in a gas state-space defined by the coordinates x=BW, y=HV, e.g., as shown in FIG. 9, along with another set of axes in the gas state-space, e.g., rotated approximately 45°, which represent chamber consumption/injection, e.g., the Lean/Rich F consumption axes, i.e., as the laser uses $F_2$ the state space operating point travels outward from the center of the coordinate system, 24, toward the Lean portion of the axis. One can follow, e.g., as $F_2$ is consumed in the chamber, this travel along the axis toward the Lean direction.

Fluorine consumption generally causes the chamber move from Rich to Lean on the consumption axis, i.e., get leaner, i.e., the gas state-space point moves in the HV High direction as shown, e.g., in FIG. 9. A higher voltage than desired or targeted is indicated as being needed to maintain output power in the output of the laser. A typical injection causes the laser to get richer, i.e., the gas state-space operating point moves in the HV Low direction on the HV axis as shown in FIG. 9.

The gas state space can also be used as a "target":

1. Assuming that the injection/consumption cycle is repeatable, it should be possible, e.g., to be able to follow a loop around repeatedly in Gas State space 10' as follows:

a. starting at a gas state at the dot 24 indicated in FIG. 9, i.e., at the target, the origin of the coordinate system, the controller can, e.g., perform an inject, which, e.g., puts the system gas state at the point 40 as shown, e.g., in FIG. 9;

b. as the laser fires, the gas state will move in the "Lean" direction for the chambers, but could wind up at point 41 as shown in the circles in FIGS. 9 and 10 (or anywhere else);

c. if the ACR estimates were correct, after an injection, the system should have arrived at the target 40;

According to aspects of an embodiment of the present invention, the $F_2$ gas injection control system may be understood to operate to first perform an Adaptive Fluorine Injection ("AFI") software initialization, then to compute duty cycle and then to execute an AFI state machine. A software initialization, as is understood in the art, may occur, e.g., because new software is loaded on the laser or if there is a major change to the laser operating conditions, e.g., installing or servicing certain laser sub-systems, e.g., the chamber, line narrowing package, etc. of after performing a system realignment. Accordingly, the operator may then reload the software, perform a gas refill, set a configurable representing an initial reference voltage ("RefVInit") to zero, re-boot the laser (i.e., power down and then up), during which both the "auto_injection" and "paddle enable" may need to be "enabled" from the "Gas Mode" button on the paddle. Thereafter, the operator may then set the laser to fire, e.g., in a selflock firing mode, 75% DC, internal energy mode, and with a nominal energy target. The laser may then be fired, e.g., for >10 minutes in this condition, after which the operator will need to verify that the RefVInit configurable has been changed by the software to 1.

The reference duty cycle bins ("updatedcb") may be stored in memory, e.g., a non-volatile RAMNVRAM, and may be initialized during AFI software initialization, e.g., using the nominal duty cycle bin values and existing laser conditions and parameters. The bins may be used to obtain the duty cycle bin and/or energy duty cycle bin indices [bin i and i'] corresponding to the respective current duty cycle. The software may then compute the $\Delta$Voltage and $\Delta$BW using the following equations:

$\Delta$Voltage=$V$nominal [bin $i$]–Average Voltage over the last 10K shots ("$V_{10K average}$")

delta$BW$=$BW$nominal [bin $i'$]–$BW$ average over the last 10K $V_{ref}Shots$ ("$BW_{10K Average}$")

In these calculations, $V_{10K Average}$ and $BW_{10K Average}$ may be evaluated at the end of an initialization period.

The reference duty cycle bins ("updatedcb") may also be updated using the following formulae:

($x$=0 to 4)

MaxDutyCycle ref [bin x]=MaxDutyCycle nominal [bin x]

InjectFrequency ref [bin x]=InjectFrequency nominal [bin x]

$V$ref [bin $x$]=($V$nominal [bin $x$]–deltaVoltage)+ ($Vlt$Scale/2), where $Vlt$_Scale is a configurable that can be used to regulate the amount of change in $V_{ref}$.

$BW$ref [bin $x$]=($BW$nominal [bin $x$]–delta$BW$)– ($BW$_Scale/2), where $BW_{13}$ Scale is a configurable similar in utilization to $Vlt$_Scale.

$V_{ref}$ and $BW_{ref}$ may also play a part in the setting of the size of the target circles, i.e., $R_{inner}$ and $R_{outer}$, as discussed below.

The configurable RefVInit may be set to 1 to indicate successful AFI software initialization.

The software may issue a warning ("DC not high enough"), if, e.g., after a certain time period, e.g., at the 5 minute mark of the initialization routine, the duty cycle value is less than 50%. The software may issue an error signal ("F2 init failed"), if after a certain period of time, e.g., at the 10 minute mark of the initialization routine, the duty cycle value is less than 50% or a REFILL_REQ bit has been set. In such an event, the laser state may be dropped to STANDBY.

The duty cycle (g_dutycycle) may be periodically computed, e.g., once every minute using the formula:

g_dutycycle=shots_in_one_minute/(C0*60)

Where CO may be a maximum pulse repetition rate ("MaxRepRate").

The energy duty cycle may be computed using the formula:

energydutycycle=g_dutycycle*(Avg10 kEngy/DefaultEnergySetPt)

The AFI state may be stored in memory.

The AFI state starts at the NEWOPSTATE when the software is installed, which serves simply to allow sufficient time after an operation change for the gas state to settle. The AFI state may then transition from NEWOPSTATE to FIXEDOPSTATE if either:

(shots in Mshots, fired in NEWOPSTATE)>(1.25–g_dutycycle/100) and RefVInit=1, or the elapsed time in NEWOPSTATE is greater than 10 minutes. At the time of exiting NEWOPSTATE, if the duty cycle is zero a flag ("DutyCycleZero") may be set to TRUE, else it is set to FALSE. This flag may be used in FIXEDOPSTATE and INJECTSTATE.

The software may then determine Boost State, whereby Vcurrent may be obtained by adjusting the current voltage for energy changes such that Vcurrent=the average voltage for the last number of shots, e.g., ("Avg10KVolts") minus the average energy for the last number of shots, e.g., ("Avg10Kenergy")–a default energy setpoint ("DefaultEnergySetPt")/dE/dV actual ("dEdV Act").

The software may then look to the bins to obtain the duty cycle bin and energy duty cycle bin indices [bin i and i'] corresponding to the current duty cycle, and compute the Verror and BWerror using the following equations:

$V$error=($V$current–$V$ref [bin $i$])/Volt_Scale $BW$error=(AVG10K$BW$–$BW$ref [bin $i'$])/ $BW$_Scale*$LW$Frac/100.

VoltScale and BWScale may be range-bound, e.g., VoltScale may be range-bound for various different laser configurations, e.g., for lasers of the 7XXX series of lasers sold by applicants assignee, e.g.,

| Laser Type | Min | Max |
|---|---|---|
| 7000A (ArF) | 5 | 80 |
| 7000K (KrF) | 5 | 80 |
| 7610 | 5 | 50 |
| 7605 | 5 | 50 |

BW_Scale may be range-bound, e.g., to be between 2 and 10 pm.

The software may then compute $R_{inner}$ and $R_{outer}$ using the following equations:

$$R_{inner}=\sqrt{(Verror2+BWerror2)}/\sqrt{[(RInner\_Scale1/Volt\_Scale)^2+(RInner+Scale2/BW\_Scale*(Volt\_Norm/100)^2]}$$

$$R_{outer}=\sqrt{(Verror2+BWerror2)}/\sqrt{[(Router\_Scale1/Voltage\_Scale)^2+(Router\_Scale2/BW\_Scale*[(Volt\_Norm/100)^2]}.$$

Volt_Norm is a configurable set from 0-100 as a weighting factor for changing $R_{inner}$ and $R_{outer}$.

The software may then compute F2error using the following equation:

$$F2error=(Verror-BWerror)/\sqrt{2}$$

The software may then compute the Boost State, e.g., according to the values in Table III:

TABLE III

| |$R_{inner}$| |$R_{outer}$| | Sign of $F_2$Error | Boost State |
|---|---|---|---|
| <1 | | | 0 |
| >1 | <1 | + | +1 |
| >1 | <1 | − | −1 |
| >1 | ≧1 | + | +2 |
| >1 | ≧1 | − | −2 |

The Boost State diagnostic values, e.g., $R_{inner}$, $R_{outer}$, F2error, BWerror, and Boost State may be stored in memory.

The software may then determine a new Active Consumption Rate ("ACR") as follows:

new ACR=old ACR+(Boost State$_{ACR}$*ACRGainFactor)

where the gain factor may vary from laser to laser, e.g., as shown in Table IV:

TABLE IV

| Laser Type | ACR Gain Factor |
|---|---|
| 7600A | 7 |
| 7600K | 5 |
| 7610 | 5 |
| 7605 | 5 |

If the new ACR is outside of a certain range, e.g., as shown in Table V, i.e. ACR value is not changed.

TABLE V

| Laser Type | Min | Max |
|---|---|---|
| 7600A | 100 | 700 |
| 7600K | 30 | 550 |
| 7610 | 30 | 550 |
| 7605 | 30 | 550 |

Figure 11:
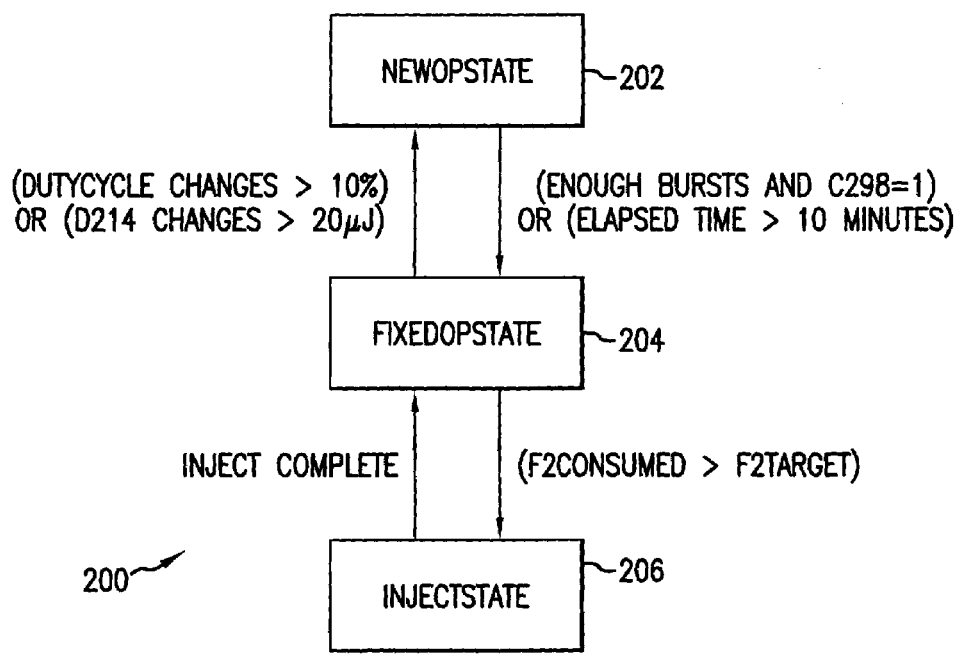
FIG. 11 shows a block diagram of a software implemented state machine according to aspects of an embodiment of the present invention.
Figure 12:
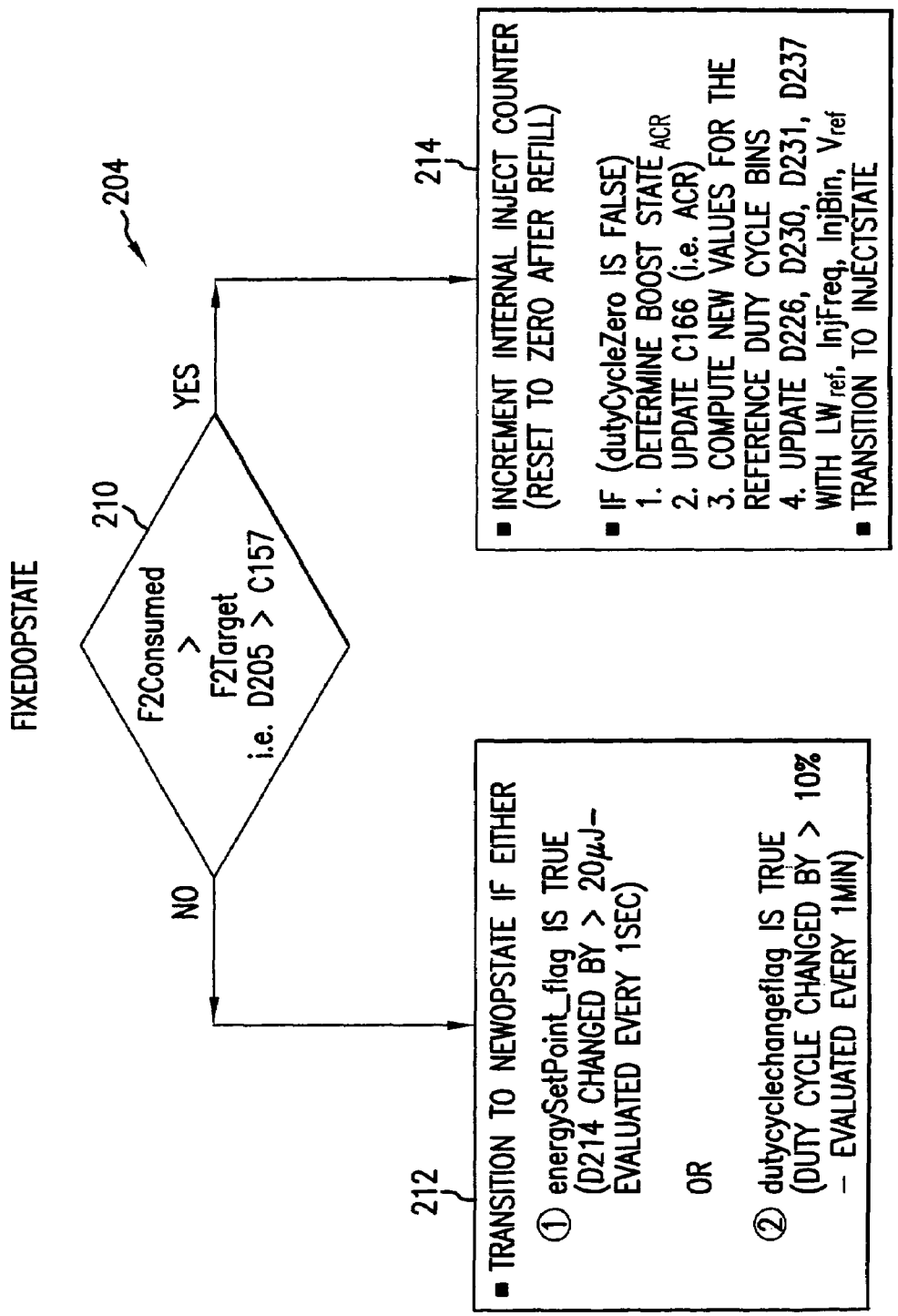
FIG. 12 shows a block diagram flow chart for the FIXEDOPSTATE of the state machine of FIG. 11 according to aspects of an embodiment of the present invention.

The software may then perform, e.g., duty cycle bin adaptation, whereby new bin values may be computed and saved in a temporary bin table in the FIXEDOPSTATE, while the reference duty cycle bins may be updated in INJECTSTATE, e.g., as shown in FIGS. 11 and 12.

The inject frequency values may be modified according to the following:

The software may get the duty cycle bin index [bin i] corresponding to the current duty cycle, and the new Inject Frequency values for this bin may be modified, e.g., increased, e.g., according to the following:

InjFreq ref [bin $i$]=2+InjFreq ref [bin $i$]−(2*InjFreq ref [bin $i$]/100).

The new Inject Frequency values for the other 4 bins may be modified, e.g., decreased according to the following:

InjFreq ref [bin $y$]=InjFreq ref [bin $y$]−(2*InjFreq ref [bin $y$]/100)

The voltage and BW values may be modified according to the following, which may be computed, e.g., only if the internal inject counter value is between NInjStrt (Inject # minimum to start adaptation) and NInjStop (Inject # maximum to stop adaptation).

The software may get the duty cycle bin and energy duty cycle bin indices [bin i and i'] corresponding to the respective current duty cycle, and compute the Verror and BWerror using the following equations:

$Verror=(Vcurrent-Vref [bin\ i])$ $BWerror=(Avg10KBW-LWref [bin\ i'])$ where Vcurrent is the "energy compensated operating voltage".

If the current bin has the highest Inject Frequency value, then the new Voltage and BW values for all bins may be computed. If the current bin does not have the highest Inject Frequency value, then the new Voltage and BW values for only the respective current bins may be computed, according to the following:

$Vref [bin\ ij=Vref [bin\ i]+(Verror*0.1)$ $BWref [bin\ i']=BWref [bin\ i']+(BWerror*0.1)$ The software may then update Inject Size according to the following:

Inject Size=$F_2$Consumed (the calculated estimate of consumption as noted above)+(Boost State$_{INJ}$*$F_2$Target), in which event, if (Inject Size)≦0, then Inject Size is set to equal 0. Also stored is the value for the cumulated sum of inject sizes between the two preceding gas refills. Thus, it can be seen that the actual injection made at the occurrence of each inject opportunity, determined otherwise, e.g., from elapsed time or estimated $F_2$ consumption or shot count or the like or combinations thereof, may be a positive value or ≦0, depending upon the values of $F_2$Consumed, Boost State$_{INJ}$(±1, ±2, 0) and $F_2$ Target, the target inject size, such that, e.g., if the $F_2$Consumed value is 1 and the $F_2$Target is set to 1, and the BoostState$_{INJ}$ is determined to be −1 or −2, then the Inject Size would be negative and no inject would occur, of if, e.g., the $F_2$Consumed value is 1 and the $F_2$Target is set to 1, and the BoostState$_{INJ}$ is determined to be −1, then the Inject Size would be 0 and no inject would occur.

The following parameters shown in Table VI may be set as configurables and used by the $F_2$ gas injection control software, which may be initially set to selected values and in some cases updated during laser operation, as appropriate. They may be stored in memory in the configurable ID locations noted.

TABLE VI

| Config ID | Name | Description | Default Values | Units |
|---|---|---|---|---|
| C146 | AuInjktSz | Inject Size for Auto Injection | 10 | 0.1 kpa |
| C157 | InjTarget | Inject Target | 10 | 0.1 kpa |
| C224 | LW_Frac | Line-width Fraction | 100 | % |
| C225 | VltScale | Voltage Scale | 50 | Volt |
| C226 | BW_Scale | Bandwidth Scale | 2 | 0.01 pm |

TABLE VI-continued

| Config ID | Name | Description | Default Values | Units |
|---|---|---|---|---|
| C227 | VltInner | Volt Inner Numerator | 12 | Volt |
| C228 | VltOuter | Volt Outer Numerator | 37 | Volt |
| C229 | BWInner | BW Inner Numerator | 2 | 0.01 pm |
| C230 | BWOuter | BW Outer Numerator | 4 | 0.01 pm |
| C231 | dEdVFact | Used in the compensation of operating voltage | 60 | uJoules/Volt |
| C297 | NInjStrt | Inject # minimum to start adaptation | 1 | None |
| C298 | RefVInit | AFI Initialized, 0 = FALSE, 1 = TRUE | 0 | None |
| C299 | NInjStop | Inject # maximum to stop adaptation | 10 | None |
| C0 | RepRtMax | Max pulse repetition rate | 4000 | Hz |
| C135 | InjktDPr | manual inject size | 10 | 0.1 kpa |
| C166 | F2PerMSh | Active Consumption Rate | ~ | 0.1 kpa |
| C200 | InjShots | Shots since last injection | ~ | 1 Mshots |

The following values noted in Table VII may be also stored in memory and used by the control software and either initially computed or initially set and then possible also updated periodically as explained above. they may be stored in memory in the Data ID locations noted.

TABLE VII

| Data ID | Name | Description | Units |
|---|---|---|---|
| D224 | DEDV_10K | 10K dE dV | uJoules/Volt |
| D226 | REFLINEWIDTH | Reference Linewidth | pm |
| D227 | DUTYCYCLE | DutyCycle | % |
| D228 | RINNER | Rinner | None |
| D229 | ROUTER | Router | None |
| D230 | RefInjFrq | The frequency with which the current bin is being accessed at the time of inject decision | % |
| D231 | RefInjBin | The current bin being accessed at the time of inject decision | None |
| D232 | A10K_LW | Average 10K Linewidth | pm |
| D233 | F2 Error | F2 Error Factor | |
| D234 | LW Error | Line Width Error factor | |
| D235 | Boost State | Inject Boost factor | -2, -1, 0, 1, 2 |
| D236 | Sum Inj Size | Total inject size since last refill including manual injects | kPa |
| D237 | REFVOLTAGE | Reference Voltage | V |
| D240 | OP_POINT_STATE | Operation Point state NEWOPSTATE 0 INJECTSTATE 1 FIXEDOPSTATE 2 | None |
| D150 | InjShots | Shots since last injection | MShots |
| D205 | F2Consumed | F2 consumed based on static gas life | kpa |
| D208 | INJPERFILL | # of injects per refill | # |
| D209 | TOT_INJ_SHOTS | Number of shots since last inject | # |
| D212 | PDB_INJ_HRS | Hours since last Inject | hours |
| D214 | A10K_ENERGY | energy average of last 10 shots | mJ |
| D216 | A10K_VOLTS | volatge average of last 10 shots | V |
| D150 | InjShots | Shots since last injection | MShots |

Turning Now to FIG. 11 There is shown an example of an $F_2$ control system state machine 200 according to aspects of an embodiment of the present invention. The state machine can be seen to have, e.g., three states of operation, NEWOPSTATE 202, FIXEDOPSTATE 204 and INJECTSTATE 206. The FIXEDOPSTATE may be entered from the NEWOPSTATE when a selected number of bursts have occurred (e.g., bursts of 300-100 pulses followed by an inter-burst down time, e.g., while the scanner positions to a new location on the integrated circuit wafer in a photolithography process) and RefVoltage Initial=1, or when a selected elapsed time, e.g., ten minutes has elapsed. The NEWOPSTATE may be entered from the FIXEDOPSTATE when significant changes occur in laser operation, e.g., when the regular duty cycle changes by, e.g., >10% or the Average Energy for the last 10K shots changes with respect to by some selected threshold.

In the FIXEDOPSTATE, as illustrated in FIG. 12, according to aspects of an embodiment of the present invention, the laser $F_2$ inject control system continually monitors in decision block 210 b, e.g., every second, whether the value of $F_2$ Consumed exceeds some selected threshold value, e.g., $F_2$ Target. If not then, as illustrated by way of example, may determine in block 212 if it is appropriate to return the laser control system state machine to the NEWOPSTATE, as discussed above, i.e., if a flag (EnergySetPoint_flag) has been set indicating that Average Energy over the last 10K shots has changed from its present value by, e.g., >20 µJ, indicating a relatively large change in the current value of E, or a flag (dutycyclechange_flag) has been set indicating that the duty cycle has changed by a selected amount, e.g., 0%, evaluated, e.g., every minute.

The software can also determine in block 210 whether to transition from the FIXEDOPSTATE to INJECT STATE, if $F_2$ Consumed is >$F_2$ Target. In this event, the software may in block 214, e.g., increment an internal inject counter (which is also reset to zero after each gas refill), and if DutyCycleZero_flag is not set, i.e., the laser is in operation, the software may, e.g., determine the Boost State$_{ACR}$, and update ACR, and compute new values for the reference duty cycle bin of Table II as discussed above, and also update BW$_{ref}$, INJFREQ, INJ BIN, and V$_{REF}$ and then transition into the INJECTSTATE 206.

Figure 13:
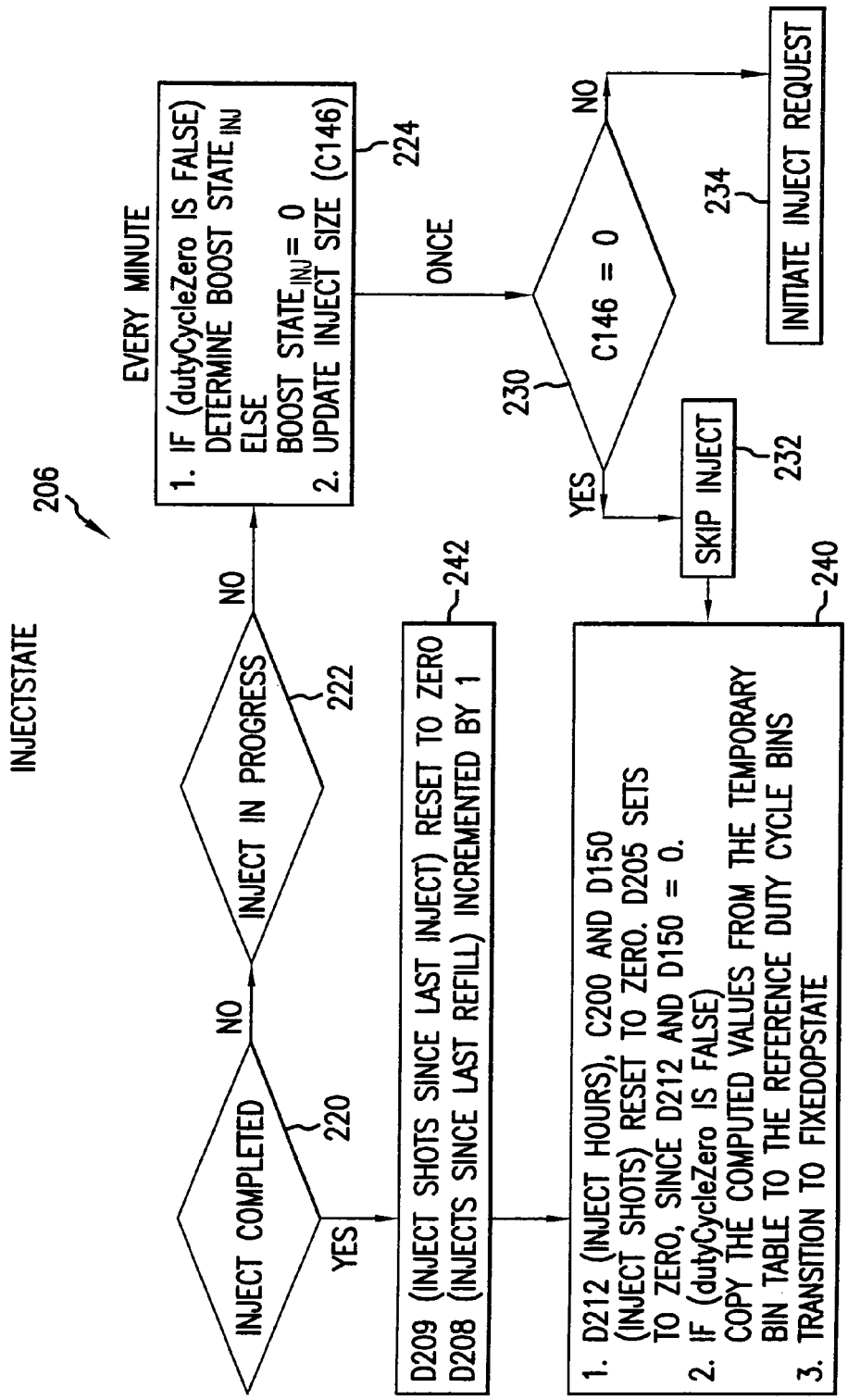
FIG. 13 shows a block diagram flow chart for the INJECTSTATE of the state machine of FIG. 11 according to aspects of an embodiment of the present invention.

In the INJECTSTATE, as illustrated in FIG. 13, according to aspects of an embodiment of the present invention, the $F_2$ injection control software may determine in block 220 if the inject has been completed, and if not then the software may determine in block 222 whether an injection is in progress. If not then in block 224 the software periodically, e.g., every minute may determine if the DutyCycleZero_flag is set and if not then determine the Boost State$_{INJ}$, and if so then set the Boost Stater$_{INJ}$ to 0. The software will also update the Inject Size. The software then moves to decision box 230 where it determines whether or not the inject size is equal to zero. If yes, then the software in block 323 commands no inject and if not, then the software in block 234 commands the initiation of an inject request according to some selected inject amount and the value of the boost amount.

If the command is to skip the inject then the software moves to block 240 the same way that it would if in decision block 220 it was determined that the inject had been completed and subsequently in block 242 the value of Inject Shots since last inject is set to zero and the value of Injects since last refill is set to 1, which may later then be incremented by 1 for each inject, before moving to block 240. In block 240 the value of Inject Hours is set to zero and the inject shot counter is set to zero and Inject shots is set to zero. $F_2$ Consumed will also be reset to zero since Inject Hours and Inject Shots are reset to zero and both ACR*Inject Shots and PCR*Inject Hours will both therefore be 0 initially. In addition, if the DutyCycleZero_flag is not set, then the software will copy the computed values from the temporary bin table to the reference duty cycle bins, e.g., Table II. The software will then transition to FIXEDOPSTATE.

Those skilled in the art will understand that the present invention is subject to many variations and modifications that will be well known and appreciated by those skilled in the art. For example, the bins may be arranged in other than the ranges noted, e.g., by a specific duty cycle and selection o f the bin may be made by proximity of the calculated duty cycle to the possible choices identifying each bin or alternatively interpolation may be done between the two adjacent closest bin according to the proximity of the actual duty cycle to the value identifying each such bin. It will also be understood that in three or higher dimensions the "rings" of the wheel will be spheres or such other multidimensional state space structures as are appropriate. It will also be understood by those skilled in the art that the number of rings/spheres or other multidimensional region-defining shapes, as the limit approached infinity, may represent unique curves or surfaces having, e.g., a defined vector distance from the origin, and/or may represent many more that just the several boost values of the presently preferred embodiments and/or be able to be interpolated between adjacent regions to arrive at what approaches a continuum of boost values determined from the position of the operating point in the state-space coordinate system, and region as used in the specification of the present application is intended to encompass regions in a state-space coordinate system that may, e.g., lie in a three dimensional coordinate system but not have three dimensions, e.g., the pints on the surface of a sphere. It will also be understood that the injections of a selected amount of fluorine gas including, e.g., and ACR with or without plus or minus boosts may be made in any fashion understood in the art, e.g., fluorine gas alone or fluorine and a buffer gas or fluorine and a buffer gas and noble gas and may be measured in any suitable way known in the art, e.g., in kPa, partial pressure, molecular content and may, e.g., account for the temperature and pressure of the gas in the chamber at or around the time of the gas replenishment injection of fluorine.

We claim:

1. A method for controlling the output of a gas discharge laser comprising the steps of:
    establishing a multidimensional variable state space comprising a coordinate system having at least two coordinates, each coordinate comprising a selected variable representing an operating or output parameter of the gas discharge laser;
    tracking a multidimensional operating point in the multidimensional variable state space according to the variation of the selected variables in the gas discharge laser to determine the position of the multidimensional operating point in the multidimensional variable state space;
    determining from the position of the multidimensional operating point in the multidimensional variable state space a region from a plurality of defined regions in the multidimensional variable state space in which the multidimensional operating point is located and identifying the region;
    based upon the identity of the identified region, and parameters of that region relative to the condition of an actuator in the gas discharge laser, determining a necessary modification to the actuator for the gas discharge laser to attempt to move the multidimensional operating point from the parameters indicated by the position of the multidimensional operating point being in the particular region to a preselected location in the coordinate system.

2. The method of claim 1 further comprising:
    the multidimensional variable state space comprises a two-dimensional state space.

3. The method of claim 2 further comprising:
    the two dimensional state space comprises one axis as the operating voltage of the gas discharge laser and the other axis as the bandwidth of the gas discharge laser output laser light pulse beam.

4. The method of claim 1 further comprising:
    the regions in the multidimensional variable state space comprise an inner target, a first outer region having an inner boundary adjacent to the inner target and an outer boundary and a second outer region adjacent to the outer boundary of the first outer region.

5. The method of claim 1 further comprising:
    the inner target comprises the origin of the coordinate system.

6. The method of claim 1 further comprising:
    a parameter used in defining the origin of the coordinate system comprises duty cycle.

7. The method of claim 1 further comprising:
    the actuator comprises the composition of the gas mixture inside of the gas discharge laser.

8. A method for controlling the output of a gas discharge laser comprising the steps of:
    establishing a multidimensional variable state space comprising a coordinate system having at least two coordinates, each coordinate comprising a selected variable representing an operating or output parameter of the gas discharge laser;
    changing the gas mixture in the gas discharge laser by injection of at least one constituent gas in the gas mixture at least part of which injection is based upon a calculated estimate of consumption of the at least one constituent gas in the gas mixture in the gas discharge laser from a prior change in the gas mixture;
    allowing the gas discharge laser to operate for a selected period of time with the changed gas mixture;
    determining the position of an operating point in the multidimensional variable state space and based upon the location of the operating point in the multidimensional variable state space determining a respective boost factor to modify the calculated estimate of consumption for the current change of the gas mixture.

9. The method of claim 8 further comprising:
    the multidimensional variable state space comprises a two dimensional state space having two coordinates:
    the first coordinate comprises measure of a spectral characteristic of the gas discharge laser output light pulse beam; and
    the second coordinate comprises another operating or output parameter of the gas discharge laser.

10. The method of claim 9 further comprising:
    the boost factor comprises a ±1, ±2 or 0.

11. The method of claim 10 further comprising:
    the first coordinate comprises operating voltage and the second coordinate comprises bandwidth.

12. The method of claim 11 further comprising:
    the position of the operating point in the multidimensional variable state space is indicative of a needed correction to the spectral characteristic of the output laser light pulse beam;
    changing the spectral characteristic of the laser output light pulse beam using a gas injection.

13. An apparatus for controlling the output of a gas discharge laser comprising:
    means for establishing a multidimensional variable state space comprising a coordinate system having at least two coordinates, each coordinate comprising a selected variable representing an operating or output parameter of the gas discharge laser;

means for tracking a multidimensional operating point in the multidimensional variable state space according to the variation of the selected variables in the gas discharge laser to determine the position of the multidimensional operating point in the multidimensional variable state space;

means for determining from the position of the multidimensional operating point in the multidimensional variable state space a region from a plurality of defined regions in the multidimensional variable state space in which the multidimensional operating point is located and identifying the region;

based upon the identity of the identified region, and parameters of that region relative to the condition of an actuator in the gas discharge laser, means for determining a necessary modification to the actuator for the gas discharge laser to attempt to move the multidimensional operating point from the parameters indicated by the position of the multidimensional operating point being in the particular region to a preselected location in the coordinate system.

14. An apparatus for controlling the output of a gas discharge laser comprising:

means for establishing a multidimensional variable state space comprising a coordinate system having at least two coordinates, each coordinate comprising a selected variable representing an operating or output parameter of the gas discharge laser;

means for changing the gas mixture in the gas discharge laser by injection of at least one constituent gas in the gas mixture at least part of which injection is based upon a calculated estimate of consumption of the at least one constituent gas in the gas mixture in the gas discharge laser from a prior change in the gas mixture;

determining means for determining, after allowing the gas discharge laser to operate for a selected period of time with the changed gas mixture, the position of an operating point in the multidimensional variable state space and based upon the location of the operating point in the multidimensional variable state space determining a respective boost factor to modify the calculated estimate of consumption for the current change of the gas mixture.

15. A method for controlling the output of a gas discharge laser comprising the steps of:

establishing a two dimensional variable state space comprising a coordinate system having two coordinates, each coordinate comprising a selected variable representing an operating parameter of the gas discharge laser;

tracking a two dimensional operating point in the two dimensional variable state space according to the variation of the selected variables in the gas discharge laser to determine the position the two dimensional operating point along an $F_2$ consumption axis in the two dimensional state space;

determining from the position of the two dimensional operating point on the $F_2$ consumption axis a region of gas consumption occupied by the operating point;

based upon the region on the $F_2$ consumption axis determining a necessary modification to the actuator for the gas discharge laser to attempt to move the multidimensional operating point based on an estimated consumption rate to a preselected location on the $F_2$ consumption axis.

16. The method of claim 15 further comprising:

the two dimensional variable state space has one coordinate axis as the operating voltage of the gas discharge laser and the other coordinate axis as another output or operating parameter of the gas discharge laser.

17. The method of claim 16 further comprising:

the other output or operating parameter of the gas discharge laser comprises the bandwidth of an output laser light pulse beam pulse.

18. The method of claim 17 further comprising:

the regions on the $F_2$ consumption axis comprise an inner target, an inner region bounded on the inner target, and an outer boundary of the inner region, and an outer region adjacent to the outer boundary of the inner region.

19. The method of claim 18 further comprising:

a parameter used in defining the origin of the coordinate system comprises duty cycle.

20. The method of claim 15 further comprising:

the actuator comprises the composition of the gas mixture inside of the gas discharge laser.

* * * * *